United States Patent
Kuroiwa

(10) Patent No.: US 9,838,567 B2
(45) Date of Patent: Dec. 5, 2017

(54) PRINT CONTROL APPARATUS AND JOB PROCESSING CONTROL PROGRAM, AND JOB PROCESSING CONTROL METHOD

(71) Applicant: Konica Minolta, Inc., Chiyoda-ku, Tokyo (JP)

(72) Inventor: Tomoko Kuroiwa, Hino (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/158,973

(22) Filed: May 19, 2016

(65) Prior Publication Data

US 2016/0352976 A1 Dec. 1, 2016

(30) Foreign Application Priority Data

Jun. 1, 2015 (JP) ................................ 2015-111182

(51) Int. Cl.
| | |
|---|---|
| G06F 15/00 | (2006.01) |
| H04N 1/60 | (2006.01) |
| H04N 1/00 | (2006.01) |
| G06K 15/02 | (2006.01) |
| G06F 3/12 | (2006.01) |

(52) U.S. Cl.
CPC ......... *H04N 1/6027* (2013.01); *G06F 3/1208* (2013.01); *G06F 3/1244* (2013.01); *G06F 3/1285* (2013.01); *G06K 15/1813* (2013.01); *G06K 15/1878* (2013.01); *H04N 1/00023* (2013.01); *H04N 1/00039* (2013.01); *H04N 1/00082* (2013.01); *H04N 2201/0082* (2013.01)

(58) Field of Classification Search
None
See application file for complete search history.

(56) References Cited

U.S. PATENT DOCUMENTS

| 7,626,728 B2 | 12/2009 | Itagaki et al. | |
|---|---|---|---|
| 2007/0201079 A1* | 8/2007 | Caine | G06Q 10/06 |
| | | | 358/1.15 |
| 2012/0243008 A1* | 9/2012 | Chatow | G06F 3/1229 |
| | | | 358/1.9 |
| 2016/0210087 A1* | 7/2016 | Amir | G06F 3/1217 |

FOREIGN PATENT DOCUMENTS

| JP | 2006-162741 A | 6/2006 |
|---|---|---|
| JP | 2006-168200 A | 6/2006 |
| JP | 2007-181142 | 7/2007 |

* cited by examiner

*Primary Examiner* — Helen Q Zong
(74) *Attorney, Agent, or Firm* — Buchanan Ingersoll & Rooney PC

(57) ABSTRACT

A print control apparatus for controlling a printing apparatus that calculates the amount of change between a designated color and a color measured, and is capable of executing a color accuracy verification, and a color correction includes: a job management unit that analyzes a print job and acquires a required color accuracy level, and calculates and manages a required time of the print job; an apparatus management unit that acquires a result of the color accuracy verification, predicts the degradation of the color accuracy, and calculates and manages a color correction effective time; and an output management unit that sets the output order of print jobs waiting to be output and the execution timing of the color correction, the required time of the print job, and the color correction effective time, and instructs the printing apparatus to execute the processing of the print job and the color correction.

13 Claims, 26 Drawing Sheets

| | | OPERABLE COLOR ACCURACY | | |
|---|---|---|---|---|
| | | LOW | MIDDLE | HIGH |
| CRITERIA | AVERAGE ΔE OF ISO12642-2 (1617 COLORS)≤8 | ○ | ○ | ○ |
| | ΔE95% OF ISO12642-2 (1617 COLORS)≤16 | ○ | ○ | ○ |
| | AVERAGE ΔH OF 3C GRAY 6 PATCHES (CMY 0 TO 100% IN STEPS OF 20%)≤1.5 | × | ○ | ○ |
| | ΔE OF SOLID COLOR IN CMYK (PRIMARY COLORS) RGB (SECONDARY COLORS)≤5 | × | × | ○ |

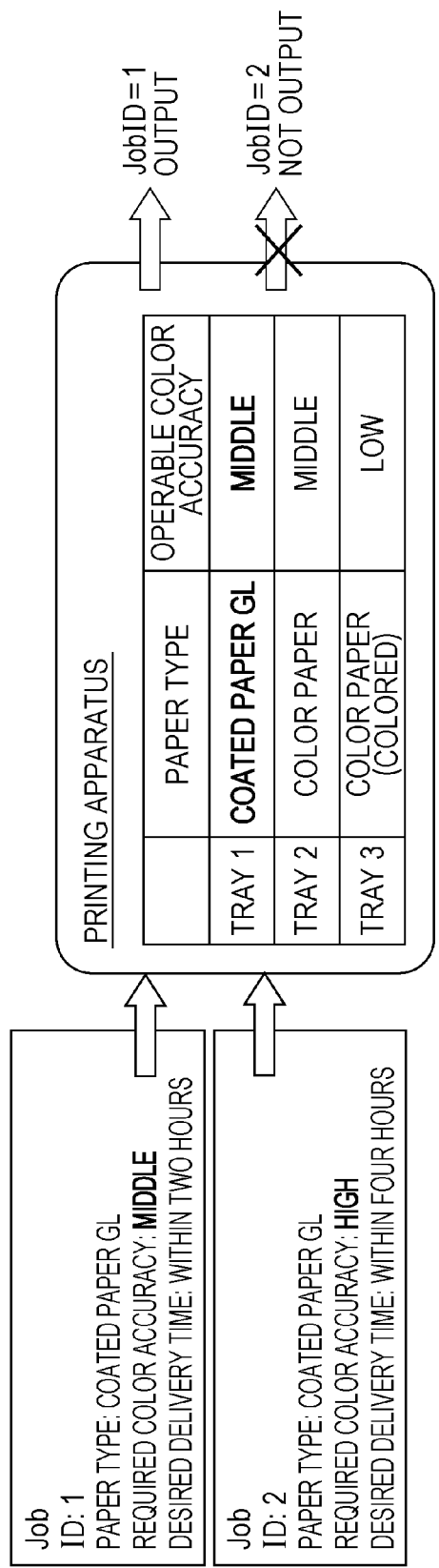

FIG. 9A

| JOB ID | DELIVERY TIME | REQUIRED COLOR ACCURACY LEVEL | REQUIRED TIME |
|---|---|---|---|
| 1 | 240 MINUTES | HIGH | 5 MINUTES |
| 2 | 120 MINUTES | MIDDLE | 10 MINUTES |
| 3 | 240 MINUTES | MIDDLE | 15 MINUTES |
| 4 | 240 MINUTES | LOW | 20 MINUTES |
| 5 | 120 MINUTES | HIGH | 15 MINUTES |

FIG. 9B

| JOB ID | DELIVERY TIME | REQUIRED COLOR ACCURACY LEVEL | REQUIRED TIME |
|---|---|---|---|
| 5 | 120 MINUTES | HIGH | 15 MINUTES |
| 2 | 120 MINUTES | MIDDLE | 10 MINUTES |
| 1 | 240 MINUTES | HIGH | 5 MINUTES |
| 3 | 240 MINUTES | MIDDLE | 15 MINUTES |
| 4 | 240 MINUTES | LOW | 20 MINUTES |

FIG. 9C

| JOB ID | DELIVERY TIME | REQUIRED COLOR ACCURACY LEVEL | REQUIRED TIME |
|---|---|---|---|
| 5 | 120 MINUTES | HIGH | 15 MINUTES |
| 1 | 240 MINUTES | HIGH | 5 MINUTES |
| 2 | 120 MINUTES | MIDDLE | 10 MINUTES |
| 3 | 240 MINUTES | MIDDLE | 15 MINUTES |
| 4 | 240 MINUTES | LOW | 20 MINUTES |

FIG. 10A

| JOB ID | DELIVERY TIME | REQUIRED COLOR ACCURACY LEVEL | REQUIRED TIME | BEFORE EXECUTION OF JOB, COLOR CORRECTION IS | ESTIMATED OUTPUT TIME |
|---|---|---|---|---|---|
| 1 | 240 MINUTES | HIGH | 5 MINUTES | PERFORMED (FIRST TIME) (ADD 12 MINUTES TO TIME REQUIRED TO OUTPUT) | 17 MINUTES LATER |
| 2 | 120 MINUTES | MIDDLE | 10 MINUTES | NOT PERFORMED | 27 MINUTES LATER |
| 3 | 240 MINUTES | MIDDLE | 15 MINUTES | NOT PERFORMED | 42 MINUTES LATER |
| 4 | 240 MINUTES | LOW | 20 MINUTES | NOT PERFORMED | 62 MINUTES LATER |
| 5 | 120 MINUTES | HIGH | 15 MINUTES | PERFORMED (SECOND TIME) (ADD 12 MINUTES TO TIME REQUIRED TO OUTPUT) | 89 MINUTES LATER |
| 6 | 120 MINUTES | HIGH | 20 MINUTES | PERFORMED (THIRD TIME) (ADD 12 MINUTES TO TIME REQUIRED TO OUTPUT) | 121 MINUTES LATER |
| 7 | 120 MINUTES | HIGH | 12 MINUTES | PERFORMED (FOURTH TIME) (ADD 12 MINUTES TO TIME REQUIRED TO OUTPUT) | 145 MINUTES LATER |
| 8 | 120 MINUTES | MIDDLE | 25 MINUTES | NOT PERFORMED | 170 MINUTES LATER |
| 9 | 240 MINUTES | MIDDLE | 30 MINUTES | NOT PERFORMED | 200 MINUTES LATER |

FIG. 10B

| JOB ID | DELIVERY TIME | REQUIRED COLOR ACCURACY LEVEL | REQUIRED TIME | BEFORE EXECUTION OF JOB, COLOR CORRECTION IS | ESTIMATED OUTPUT TIME |
|---|---|---|---|---|---|
| 5 | 120 MINUTES | HIGH | 15 MINUTES | PERFORMED (FIRST TIME) (ADD 12 MINUTES TO TIME REQUIRED TO OUTPUT) | 27 MINUTES LATER |
| 7 | 120 MINUTES | HIGH | 12 MINUTES | NOT PERFORMED | 39 MINUTES LATER |
| 6 | 120 MINUTES | HIGH | 20 MINUTES | PERFORMED (SECOND TIME) (ADD 12 MINUTES TO TIME REQUIRED TO OUTPUT) | 71 MINUTES LATER |
| 1 | 240 MINUTES | HIGH | 5 MINUTES | NOT PERFORMED | 76 MINUTES LATER |
| 2 | 120 MINUTES | MIDDLE | 10 MINUTES | NOT PERFORMED | 86 MINUTES LATER |
| 8 | 120 MINUTES | MIDDLE | 25 MINUTES | NOT PERFORMED | 111 MINUTES LATER |
| 3 | 240 MINUTES | MIDDLE | 15 MINUTES | NOT PERFORMED | 126 MINUTES LATER |
| 9 | 240 MINUTES | MIDDLE | 30 MINUTES | NOT PERFORMED | 156 MINUTES LATER |
| 4 | 240 MINUTES | LOW | 20 MINUTES | PERFORMED (THIRD TIME) (ADD 12 MINUTES TO TIME REQUIRED TO OUTPUT) | 188 MINUTES LATER |

FIG. 10C

| JOB ID | DELIVERY TIME | REQUIRED COLOR ACCURACY LEVEL | REQUIRED TIME | BEFORE EXECUTION OF JOB, COLOR CORRECTION IS | ESTIMATED OUTPUT TIME |
|---|---|---|---|---|---|
| 5 | 120 MINUTES | HIGH | 15 MINUTES | PERFORMED (FIRST TIME) (ADD 12 MINUTES TO TIME REQUIRED TO OUTPUT) | 27 MINUTES LATER |
| 7 | 120 MINUTES | HIGH | 12 MINUTES | NOT PERFORMED | 39 MINUTES LATER |
| 2 | 120 MINUTES | MIDDLE | 10 MINUTES | NOT PERFORMED | 49 MINUTES LATER |
| 8 | 120 MINUTES | MIDDLE | 25 MINUTES | NOT PERFORMED | 74 MINUTES LATER |
| 6 | 120 MINUTES | HIGH | 20 MINUTES | PERFORMED (SECOND TIME) (ADD 12 MINUTES TO TIME REQUIRED TO OUTPUT) | 106 MINUTES LATER |
| 1 | 240 MINUTES | HIGH | 5 MINUTES | NOT PERFORMED | 111 MINUTES LATER |
| 3 | 240 MINUTES | MIDDLE | 15 MINUTES | NOT PERFORMED | 126 MINUTES LATER |
| 9 | 240 MINUTES | MIDDLE | 30 MINUTES | NOT PERFORMED | 156 MINUTES LATER |
| 4 | 240 MINUTES | LOW | 20 MINUTES | NOT PERFORMED | 176 MINUTES LATER |

FIG. 21

| PPM | | | | 100 | | | |
|---|---|---|---|---|---|---|---|
| JOB ID | 1 | 2 | 3 | 4 | 5 | | |
| REQUIRED COLOR ACCURACY LEVEL | HIGH | MIDDLE | MIDDLE | LOW | HIGH | | |
| NUMBER OF PAGES | 5 | 10 | 10 | 2 | 5 | | |
| NUMBER OF COPIES | 100 | 100 | 150 | 1000 | 300 | | |
| REQUIRED TIME | 5 MINUTES | 10 MINUTES | 15 MINUTES | 20 MINUTES | 15 MINUTES | | |
| TOTAL ESTIMATED PRINT TIME | JOB OF DELIVERY TIME 120 MINUTES | | | ... | HIGH | 47 MINUTES |
| | | | | | MIDDLE | 35 MINUTES |
| | | | | | LOW | 0 MINUTES |
| | JOB OF DELIVERY TIME 240 MINUTES | | | | HIGH | 5 MINUTES |
| | | | | | MIDDLE | 45 MINUTES |
| | | | | | LOW | 20 MINUTES |
| NUMBER OF EXECUTIONS OF COLOR CORRECTION | JOB OF DELIVERY TIME 120 MINUTES | | | | TWO (TEMPORARY) | |
| | JOB OF DELIVERY TIME 240 MINUTES | | | | ONE (FIXED) | |

FIG. 22

| COLOR CORRECTION DEGRADATION GRAPH EQUATION | | y = ax + b<br>(a, b: COEFFICIENT, x: TIME, y: COLOR ACCURACY)<br>(NOT LIMITED TO LINEAR EXPRESSION) |
|---|---|---|
| COLOR CORRECTION THRESHOLD | HIGH | yH |
| | LOW | yL |
| COLOR CORRECTION EFFECTIVE TIME | HIGH | 30 MINUTES |
| | MIDDLE | 75 MINUTES |
| | LOW | 15 MINUTES |
| PREVIOUS CORRECTION EXECUTION TIME | | 2015/02/20/13:00:00 |
| CURRENT TIME | | 2015/02/20/13:27:00 |
| COLOR CORRECTION EFFECTIVE TIME | HIGH | 2015/02/20/13:30:00 |
| | MIDDLE | 2015/02/20/14:45:00 |
| | LOW | 2015/02/20/15:00:00 |

FIG. 23

| PREVIOUS CORRECTION EXECUTION TIME | 2015/02/20/13:00:00 | |
|---|---|---|
| CURRENT TIME | 2015/02/20/13:27:00 | |
| REMAINING COLOR CORRECTION EFFECTIVE TIME | HIGH | 3 MINUTES |
| | MIDDLE | 75 MINUTES |
| | LOW | 15 MINUTES |
| NEXT JOB | REQUIRED PRINT TIME | 20 MINUTES |
| | REQUIRED COLOR ACCURACY | HIGH |

FIG. 24

| | VERIFICATION BEFORE CORRECTION | 1 MINUTE |
|---|---|---|
| ESTIMATED COLOR CORRECTION OPERATION TIME | CORRECTION | 10 MINUTES |
| | VERIFICATION AFTER CORRECTION | 1 MINUTE |

FIG. 25

| TOTAL ESTIMATED PRINT TIME | JOB OF DELIVERY TIME 120 MINUTES | HIGH | 47 MINUTES |
|---|---|---|---|
| | | MIDDLE | 35 MINUTES |
| | | LOW | 0 MINUTES |
| | JOB OF DELIVERY TIME 240 MINUTES | HIGH | 5 MINUTES |
| | | MIDDLE | 45 MINUTES |
| | | LOW | 20 MINUTES |
| ⋮ | | | |
| NUMBER OF EXECUTIONS OF COLOR CORRECTION | JOB OF DELIVERY TIME 120 MINUTES | | TWO (TEMPORARY) |
| | JOB OF DELIVERY TIME 240 MINUTES | | ONE (TEMPORARY) |
| ESTIMATED COLOR CORRECTION OPERATION TIME | VERIFICATION BEFORE CORRECTION | | 1 MINUTE |
| | CORRECTION | | 10 MINUTES |
| | VERIFICATION AFTER CORRECTION | | 1 MINUTE |

FIG. 26

| JOB ID | 1 | 2 | 3 | 4 | 5 | |
|---|---|---|---|---|---|---|
| REQUIRED TIME | 5 MINUTES | 10 MINUTES | 15 MINUTES | 20 MINUTES | 15 MINUTES | ... |
| DELIVERY TIME | 240 MINUTES | 120 MINUTES | 240 MINUTES | 240 MINUTES | 120 MINUTES | |
| REQUIRED COLOR ACCURACY | HIGH | MIDDLE | MIDDLE | LOW | HIGH | |

| COLOR CORRECTION EFFECTIVE TIME | HIGH | 30 MINUTES |
|---|---|---|
| | MIDDLE | 75 MINUTES |
| | LOW | 15 MINUTES |

FIG. 27

| JOB ID | DELIVERY TIME | REQUIRED COLOR ACCURACY LEVEL | REQUIRED TIME | EXECUTION OR NON-EXECUTION OF COLOR CORRECTION BEFORE EXECUTION OF JOB | ESTIMATED OUTPUT TIME | (ESTIMATED) APPARATUS STATUS AFTER OUTPUT |
|---|---|---|---|---|---|---|
| 5 | 120 MINUTES | HIGH | 15 MINUTES | EXECUTION | 27 MINUTES LATER | HIGH: 15 MINUTES LEFT |
| 7 | 120 MINUTES | HIGH | 12 MINUTES | NON-EXECUTION | 39 MINUTES LATER | HIGH: 3 MINUTES LEFT |
| 6 | 120 MINUTES | HIGH | 20 MINUTES | EXECUTION | 71 MINUTES LATER | HIGH: 10 MINUTES LEFT |
| 2 | 120 MINUTES | MIDDLE | 10 MINUTES | NON-EXECUTION | 81 MINUTES LATER | MIDDLE: 75 MINUTES LEFT |
| 8 | 120 MINUTES | MIDDLE | 25 MINUTES | NON-EXECUTION | 106 MINUTES LATER | MIDDLE: 50 MINUTES LEFT |
| 1 | 240 MINUTES | HIGH | 5 MINUTES | EXECUTION | 123 MINUTES LATER | HIGH: 25 MINUTES LEFT |
| 3 | 240 MINUTES | MIDDLE | 15 MINUTES | NON-EXECUTION | 138 MINUTES LATER | HIGH: 10 MINUTES LEFT |
| 9 | 240 MINUTES | MIDDLE | 30 MINUTES | NON-EXECUTION | 168 MINUTES LATER | MIDDLE: 55 MINUTES LEFT |
| 4 | 240 MINUTES | LOW | 20 MINUTES | NON-EXECUTION | 188 MINUTES LATER | MIDDLE: 35 MINUTES LEFT |

FIG. 28

| JOB ID | DELIVERY TIME | REQUIRED COLOR ACCURACY LEVEL | REQUIRED TIME | EXECUTION/NON-EXECUTION OF COLOR CORRECTION BEFORE EXECUTION OF JOB | ESTIMATED OUTPUT TIME | (ESTIMATED) APPARATUS STATUS AFTER OUTPUT |
|---|---|---|---|---|---|---|
| 5 | 120 MINUTES | HIGH | 15 MINUTES | EXECUTION | 27 MINUTES LATER | HIGH: 15 MINUTES LEFT |
| 7 | 120 MINUTES | HIGH | 12 MINUTES | NON-EXECUTION | 39 MINUTES LATER | HIGH: 3 MINUTES LEFT |
| 6 | 120 MINUTES | HIGH | 20 MINUTES | EXECUTION | 71 MINUTES LATER | HIGH: 10 MINUTES LEFT |
| 1 | 240 MINUTES | HIGH | 5 MINUTES | NON-EXECUTION | 76 MINUTES LATER | HIGH: 5 MINUTES LEFT |
| 2 | 120 MINUTES | MIDDLE | 10 MINUTES | NON-EXECUTION | 86 MINUTES LATER | MIDDLE: 70 MINUTES LEFT |
| 8 | 120 MINUTES | MIDDLE | 25 MINUTES | NON-EXECUTION | 111 MINUTES LATER | MIDDLE: 45 MINUTES LEFT |
| 3 | 240 MINUTES | MIDDLE | 15 MINUTES | NON-EXECUTION | 126 MINUTES LATER | MIDDLE: 30 MINUTES LEFT |
| 9 | 240 MINUTES | MIDDLE | 30 MINUTES | NON-EXECUTION | 156 MINUTES LATER | LOW: 15 MINUTES LEFT |
| 4 | 240 MINUTES | LOW | 20 MINUTES | EXECUTION | 188 MINUTES LATER | HIGH: 10 MINUTES LEFT |

FIG. 29

ALL JOBS OF DELIVERY TIME 120-MINUTE GROUP
CANNOT BE OUTPUT WITHIN DELIVERY TIME.

● TRANSFER JOBS TO ANOTHER PRINTING APPARATUS
○ CHANGE REQUIRED COLOR ACCURACY OF JOBS
○ CHANGE DELIVERY TIMES OF JOBS

OK

PRINT CONTROL APPARATUS AND JOB PROCESSING CONTROL PROGRAM, AND JOB PROCESSING CONTROL METHOD

The entire disclosure of Japanese Patent Application No. 2015-111182 filed on Jun. 1, 2015 including description, claims, drawings, and abstract are incorporated herein by reference in its entirety.

BACKGROUND OF THE INVENTION

Field of the Invention

The present invention relates to a print control apparatus and a job processing control program, and a job processing control method, and particularly relates to a print control apparatus that controls a printing apparatus including a color correction function and a job processing control program that controls print job processing based on color accuracy, and a job processing control method.

Description of the Related Art

When printing apparatuses including a color printing function, such as copiers and multi-functional peripherals (MFP: Multi-Functional Peripherals), are used to print in color, color management for accurately reproducing colors included in each page of a print job is important. Hence, a color correction is conventionally made by reading, with a colorimeter, a color correction-purpose chart where a color patch is placed, comparing color information that theoretically should be output and the actual color value measured by the colorimeter, obtaining the amount of change in color, and feeding it back such that the amount of change in color falls within an appropriate range.

In terms of the color correction, for example, JP 2006-162741 A discloses an image forming apparatus having a plurality of image forming methods for forming an image on a medium, the image forming apparatus including first calibration execution means for executing calibration for making the characteristic of image formation constant in accordance with a first image forming method, and determination means for determining the first calibration execution result, and image forming method change means for changing the image forming method to a second image forming method based on the determination result obtained by the determination means.

Moreover, JP 2007-181142 A discloses a color processing method including a first input step of inputting measurement data of a screen uniformity evaluation-purpose first chart output from an image forming apparatus, a first calculation step of calculating a color difference of the first chart between a predetermined category and another category based on the measurement data of the first chart, a second input step of inputting measurement data of a color matching level evaluation-purpose second chart output from the image forming apparatus, the second chart including a plurality of measurement-purpose patches, and reference data including measurement results of the measurement-purpose patches, a second calculation step of calculating a color difference between a color target contained in the reference data and its corresponding measurement-purpose patch of the second chart based on the reference data and the measurement data of the second chart, and a control step of executing the second input and calculation steps if the calculation result of the first calculation step satisfies a screen uniformity criterion, and not executing the second input and calculation steps if the calculation result of the first calculation step does not satisfy the criterion.

In such a color correction, the manual operation of a colorimeter located outside a printing apparatus by an operator or serviceman is conventionally mainstream. However, some of recent years' printing apparatuses include a colorimeter. They themselves can make a color correction automatically. With the automated color correction, a color correction is always executed before a job for which color accuracy is important. Accordingly, it becomes possible to prevent the occurrence of an image quality abnormality and prevent an output from failing to deliver and being discarded.

As a technology related to control over timing of the color correction, for example, JP 2006-168200 A discloses a printing system for outputting based on output data, the printing system including means for measuring a patch image output from a targeted output device and calibrating the color reproducibility of the output device based on the association relationship between the measured value and an output signal, means for recording a measured value obtained when the previous color calibration was performed by the output device, means for recording the date and time when the previous color calibration was performed, and means for calculating the amount of change in output characteristic based on the recorded previous measured value, the printing system being configured to calculate the relationship between the amount of change and an elapsed time based on the calculated amount of change and the elapsed time from the previous color calibration, and update and record the relationship in a cumulative manner.

As described above, in the method that executes a color correction on every execution of a print job for which color accuracy is important, consumable materials such as paper and toner and time are uselessly consumed due to the output and measurement of a color correction-purpose chart. To deal with this problem, JP 2006-168200 A discloses a method for accumulating the relationship between the amount of change in output characteristic and an elapsed time and recommending the execution of calibration if the time that is determined to exceed an allowable amount of change has come, and accordingly determining an optimum calibration interval.

However, the technology of JP 2006-168200 A executes a color correction whenever the amount of change exceeds the allowable limit. Therefore, not so high color accuracy is required. A color correction is automatically executed even on a print job that can be output without executing a color correction, when the amount of change exceeds the allowable limit. The consumption of consumable materials and time cannot be effectively prevented.

SUMMARY OF THE INVENTION

The present invention has been made considering the above problem, and a main object thereof is to provide a print control apparatus and a job processing control program, and a job processing control method that can appropriately control the output of a print job in accordance with the color accuracy required for the print job.

To achieve the abovementioned object, according to an aspect, a print control apparatus for controlling a printing apparatus configured to calculate the amount of change between a designated color and a color measured by printing a patch of the designated color, and be capable of executing a color accuracy verification for verifying color accuracy based on the amount of change in color, and a color correction for adjusting a color to be printed such that the amount of change in color falls within a predetermined range reflecting one aspect of the present invention comprises: a job management unit configured to analyze a print job and acquire a required color accuracy level specifying color accuracy required for the print job, the required color accuracy level being preset in the print job, and also calculate and manage a required time of the print job; an apparatus management unit configured to acquire a result of the color accuracy verification from the printing apparatus, predict the degradation of the color accuracy of the printing apparatus based on the result, and calculate and manage a color correction effective time according to the color accuracy level of the printing apparatus; and an output management unit configured to set the output order of a plurality of print jobs waiting to be output and the execution timing of the color correction based on the required color accuracy level, the required time of the print job, and the color correction effective time according to the color accuracy level of the printing apparatus, and instruct the printing apparatus to execute the processing of the print job and the color correction.

To achieve the abovementioned object, according to an aspect, a non-transitory recording medium storing a computer readable job processing control program to operate on a print control apparatus for controlling a printing apparatus configured to calculate the amount of change between a designated color and a color measured by printing a patch of the designated color, and be capable of executing a color accuracy verification for verifying color accuracy based on the amount of change in color, and a color correction for adjusting a color to be printed such that the amount of change in color falls within a predetermined range, the job processing control program reflecting one aspect of the present invention causes the print control apparatus to execute: a first process of analyzing a print job and acquiring a required color accuracy level specifying color accuracy required for the print job, the required color accuracy level being preset in the print job, and also calculating and managing a required time of the print job; a second process of predicting the degradation of the color accuracy of the printing apparatus based on a result of the color accuracy verification, and calculating and managing a color correction effective time according to the color accuracy level of the printing apparatus; and a third process of setting the output order of a plurality of print jobs waiting to be output and the execution timing of the color correction based on the required color accuracy level, the required time of the print job, and the color correction effective time according to the color accuracy level of the printing apparatus.

To achieve the abovementioned object, according to an aspect, a job processing control method in a printing system where a printing apparatus configured to calculate the amount of change between a designated color and a color measured by printing a patch of the designated color, and be capable of executing a color accuracy verification for verifying color accuracy based on the amount of change in color, and a color correction for adjusting a color to be printed such that the amount of change in color falls within a predetermined range, a print control apparatus configured to control the printing apparatus, and a user terminal configured to transmit a print job to the print control apparatus are connected to a communication network reflecting one aspect of the present invention causes the print control apparatus to execute: a first process of analyzing the print job received from the user terminal and acquiring a required color accuracy level specifying color accuracy required for the print job, the required color accuracy level being preset in the print job, and also calculating and managing a required time of the print job; a second process of acquiring a result of the color accuracy verification from the printing apparatus, predicting the degradation of the color accuracy of the printing apparatus based on the result, and calculating and managing a color correction effective time according to the color accuracy level of the printing apparatus; and a third process of setting the output order of a plurality of print jobs waiting to be output and the execution timing of the color correction based on the required color accuracy level, the required time of the print job, and the color correction effective time according to the color accuracy level of the printing apparatus.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 7 is a diagram explaining job output control based on the color accuracy of the apparatus;

FIG. 8 is a table illustrating an example of the color accuracy level of the apparatus after color correction and a color correction effective time;

FIGS. 9A, 9B, and 9C are tables illustrating examples of a job output order;

FIG. 10A is a table illustrating an example of the job output order and color correction execution timings (in a case of processing in order of job ID);

FIG. 10B is a table illustrating an example of the job output order and color correction execution timings (in a case of sorting by required color accuracy level after sorting by delivery time);

FIG. 10C is a table illustrating an example of the job output order and color correction execution timings (in a case of further changing the order for delaying the color correction execution timing);

FIG. 21 is an example of a table managed by the job output time management unit of the print control apparatus according to an example of the present invention;

FIG. 22 is an example of a table managed by the color correction effective time management unit of the print control apparatus according to an example of the present invention;

FIG. 23 is an example of data used by the color correction necessity/nonnecessity determination unit of the print control apparatus according to an example of the present invention;

FIG. 24 is an example of data managed by the job output order change unit of the print control apparatus according to an example of the present invention;

FIG. 25 is an example of data used by the job output go/no-go determination unit of the print control apparatus according to an example of the present invention;

FIG. 26 is an example of data used by the job output order change unit of the print control apparatus according to an example of the present invention;

FIG. 27 is another example of the data used by the job output order change unit of the print control apparatus according to an example of the present invention;

FIG. 28 is another example of the data used by the job output order change unit of the print control apparatus according to an example of the present invention; and FIG. 29 is a diagram illustrating an example of a message displayed on the user terminal according to an example of the present invention.

DESCRIPTION OF THE PREFERRED EMBODIMENTS

Figure 1A:
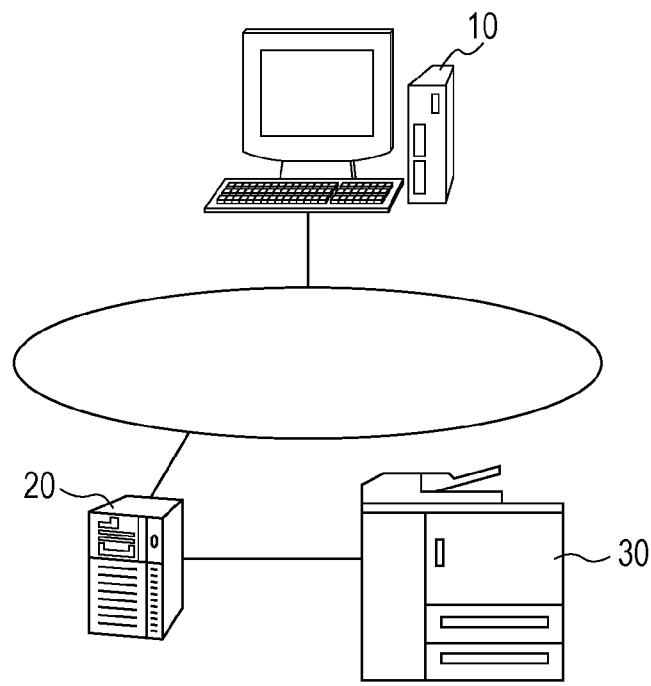
FIGS. 1A and 1B are diagrams schematically illustrating the configuration of a printing system according to an example of the present invention.

Hereinafter, an embodiment of the present invention will be described with reference to the drawings. However, the scope of the invention is not limited to the illustrated examples.

In a printing apparatus, outputtable color accuracy is reduced with the passage of time from a color correction. Hence, when a certain print job is processed, a color correction is mage if desired color accuracy cannot be maintained. However, in such a control method, a color correction cannot be efficiently made. For example, after the color correction, print jobs are processed in due order. Accordingly, even a print job that does not require high color accuracy may be printed during a period when high color accuracy output is possible, the period being immediately after the color correction. In this case, there does not arise a problem if a print job for which low color accuracy is sufficient is printed during the period when high color accuracy output is possible. However, due to the processing of the print job, the period during which high color accuracy output is possible ends before a print job that requires high color accuracy is processed. Accordingly, a color correction needs to be executed again. The number of executions of color correction is then increased. Therefore, there arises a problem that consumable materials such as paper and toner and time are uselessly consumed.

To deal with this problem, as in JP 2006-168200 A, a method is also conceivable in which the relationship between the amount of change in output characteristic and an elapsed time is accumulated to determine an optimum calibration interval. However, even this method cannot execute a color correction appropriately since a color correction is made irrespective of the color accuracy required for a print job. In other words, the known technology determines whether or not a color correction is required, based on the status of the printing apparatus. Consideration is not given to the color accuracy required for a print job. Accordingly, it is not possible to output print jobs in appropriate order and execute a color correction at an appropriate timing.

Hence, in order to enable the processing of a print job with optimum color accuracy while reducing the number of executions of color correction in an embodiment of the present invention, the level of color accuracy expected by a user (which is called a required color accuracy level) is set in the print job, and a print job output order and a color correction execution timing are controlled based on the required color accuracy level set in the print job and a color accuracy level operable (feasible) by the printing apparatus.

Specifically, control is performed such that print jobs waiting to be output are sorted by required color accuracy level (rearranged in order of required color accuracy level from highest to lowest) to preferentially output a print job whose required color accuracy level is high after color correction (when in a state where the operable color accuracy level of the printing apparatus is high). Moreover, if delivery times are set for print jobs, control is performed such that print jobs waiting to be output are sorted by delivery time (rearranged in order of delivery time from shortest to longest), and print jobs in the same delivery time groups are sorted by required color accuracy level to meet the delivery times and also preferentially output a print job whose required color accuracy level is high after color correction. Moreover, when print jobs of a given delivery time group are output, a print job of the next delivery time group is moved up in the output order in each required color accuracy level within a range where the delivery time of the given delivery time group can be met.

With such control, it is possible to prevent the discarding of defectives due to an unaccomplished color accuracy quality requirement (that a print job whose required color accuracy level is high is processed in a state where the color accuracy level operable by the printing apparatus is low) and useless consumption of consumable materials generated by the increase of the number of executions of color correction (chart sheets and toner used for measurements) and measurement time, and obtain a print output according to the required color accuracy level with little spoilage. Moreover, color corrections and print jobs are scheduled after print jobs are accumulated to some degree. Accordingly, a finishing time can be easily estimated.

EXAMPLE

Figure 1B:
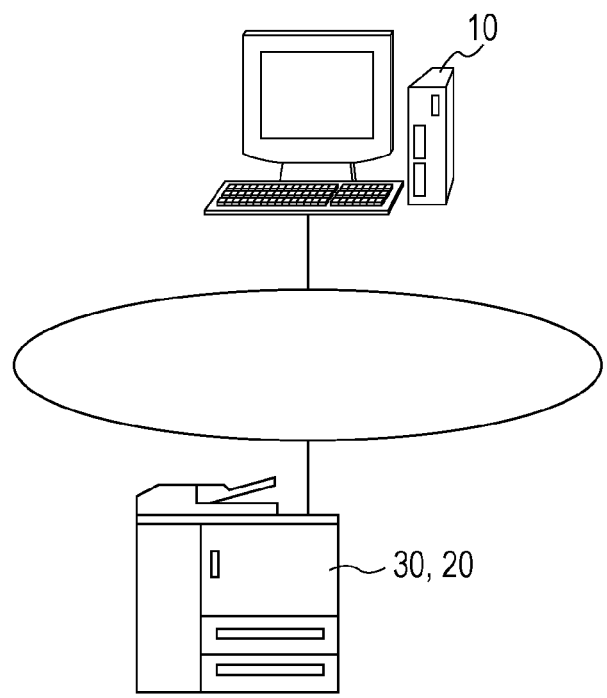
Figure 2A:
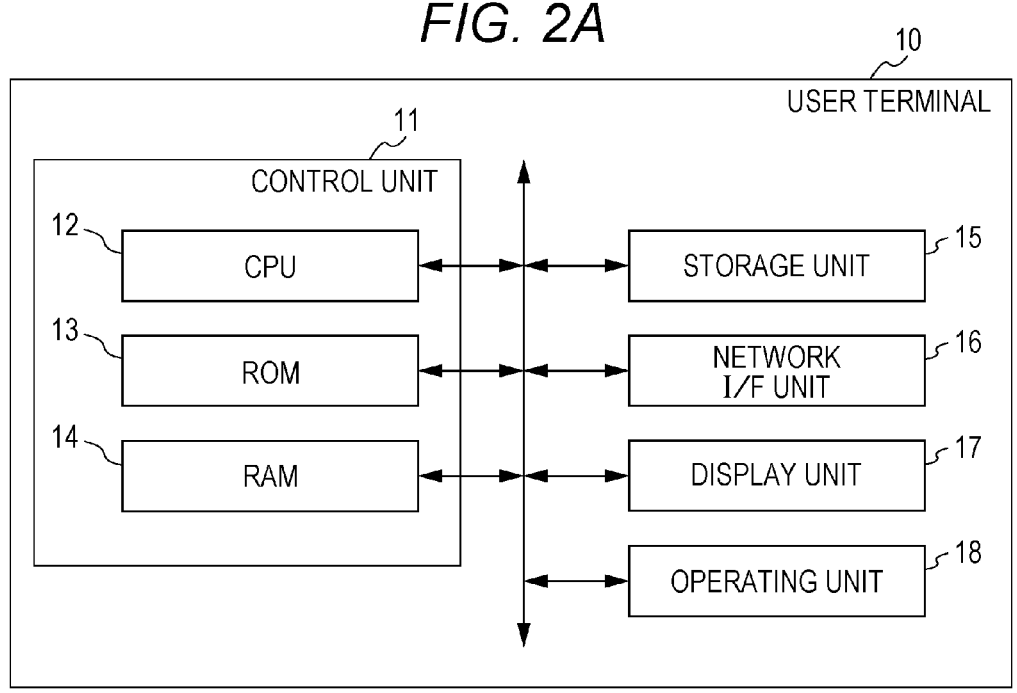
FIGS. 2A and 2B are block diagrams illustrating the configuration of a user terminal according to an example of the present invention.
Figure 2B:
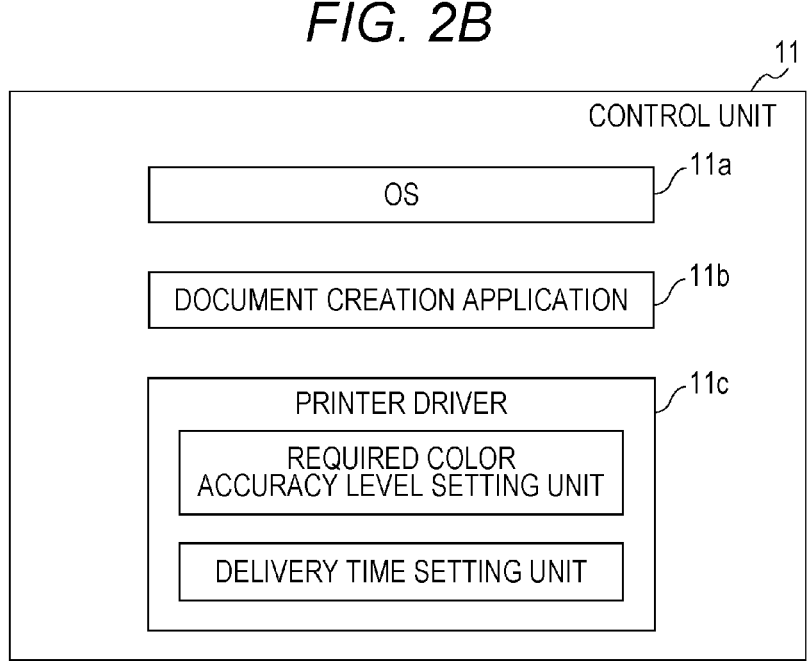
Figure 3A:
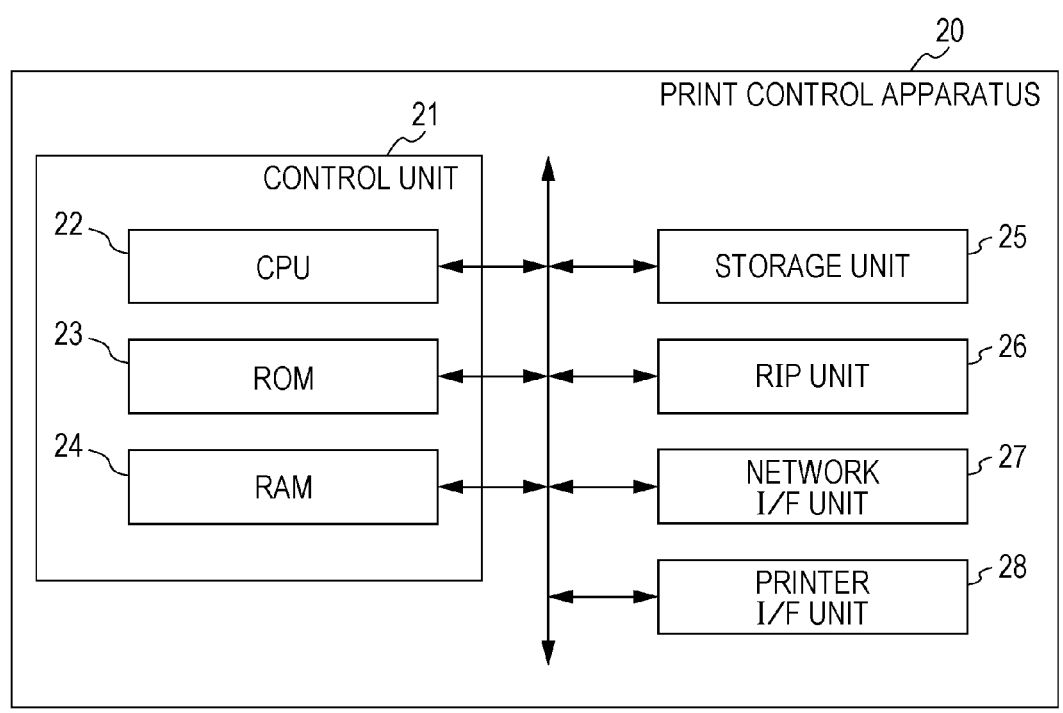
FIGS. 3A and 3B are block diagrams illustrating the configuration of a print control apparatus according to an example of the present invention.
Figure 3B:
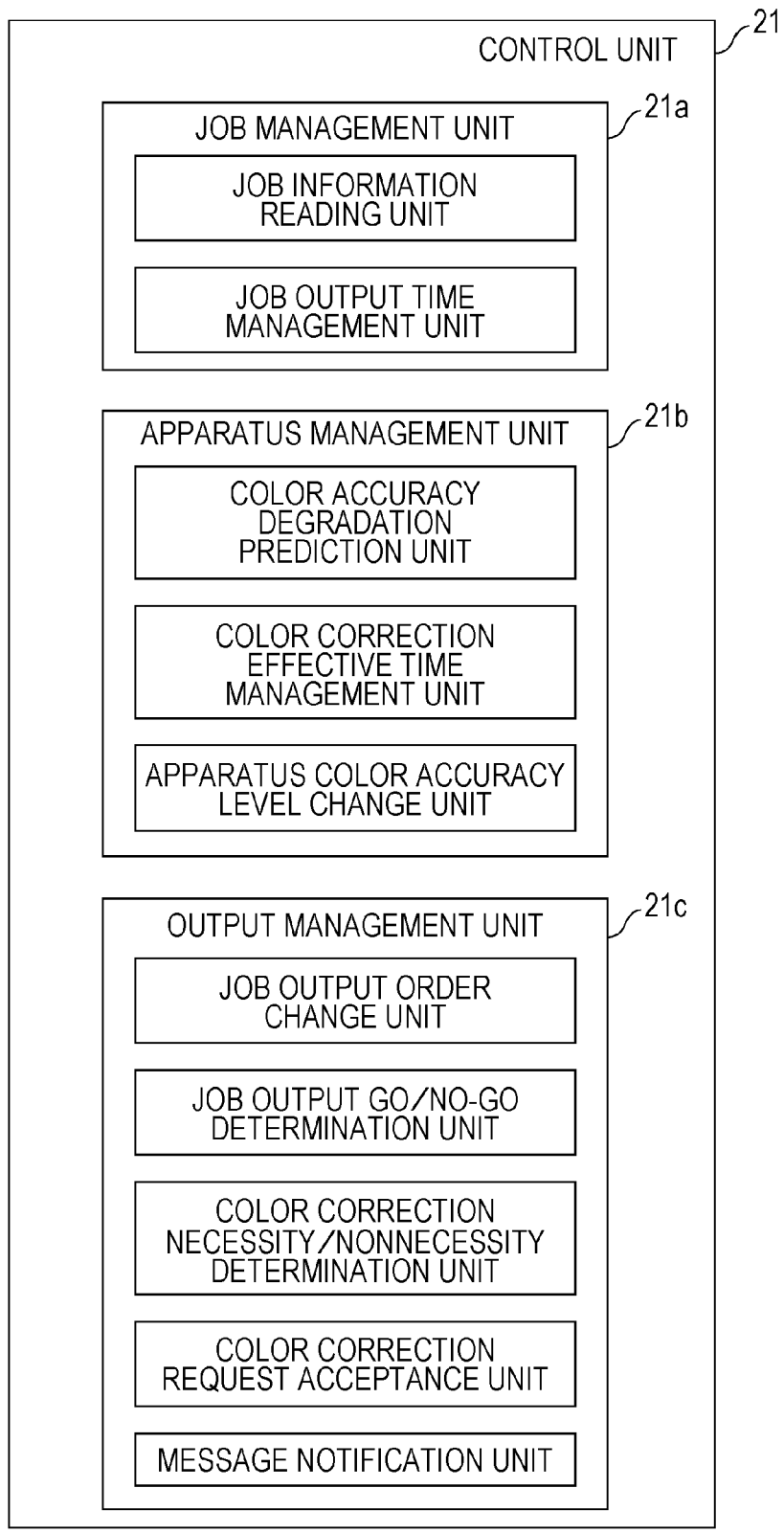
Figure 4A:
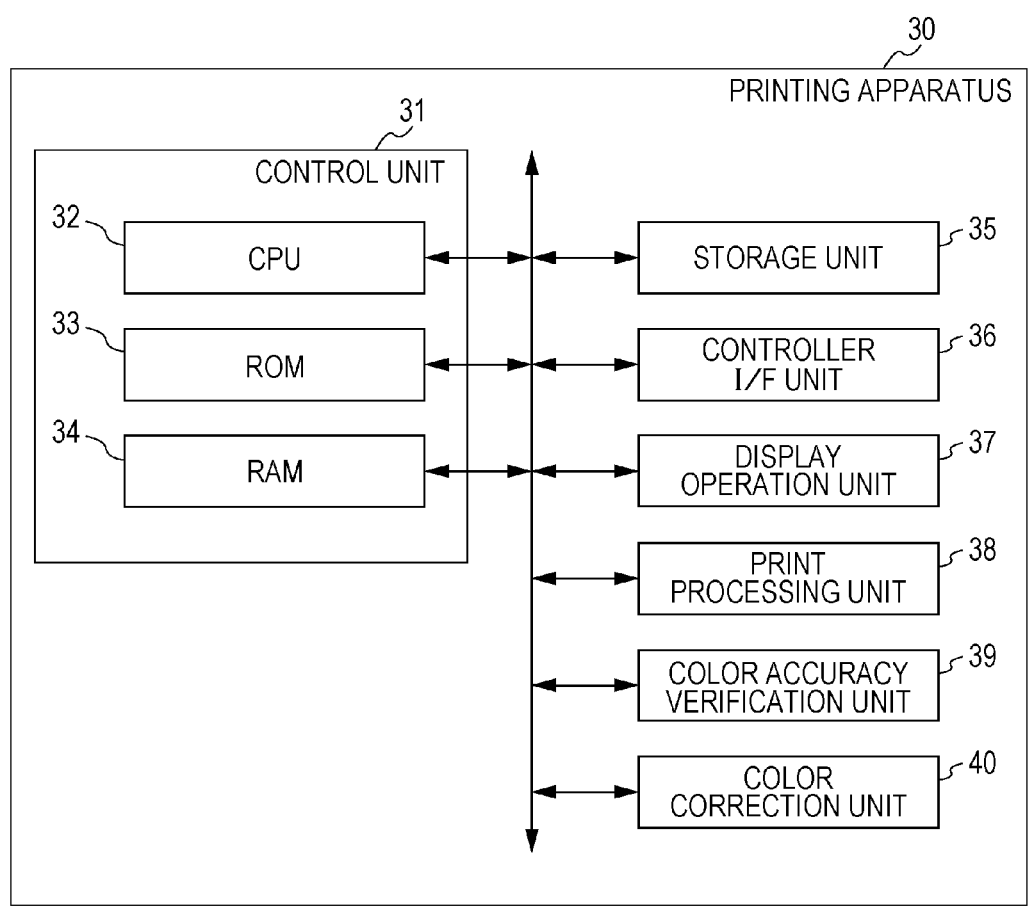
FIGS. 4A and 4B are a block diagram illustrating the configuration of a printing apparatus according to an example of the present invention, and a configuration diagram of a print processing unit.
Figure 4B:
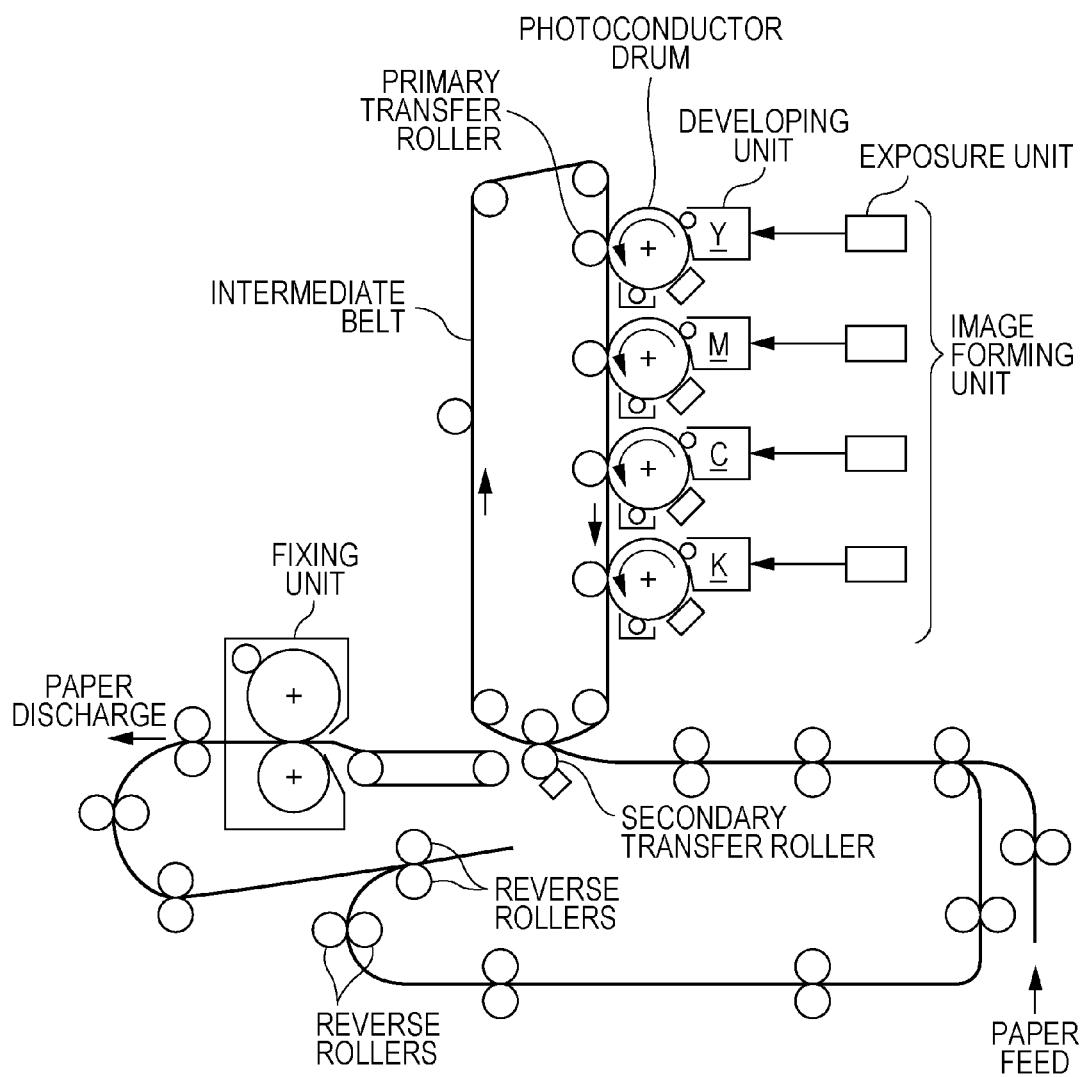
Figures 5, 6:
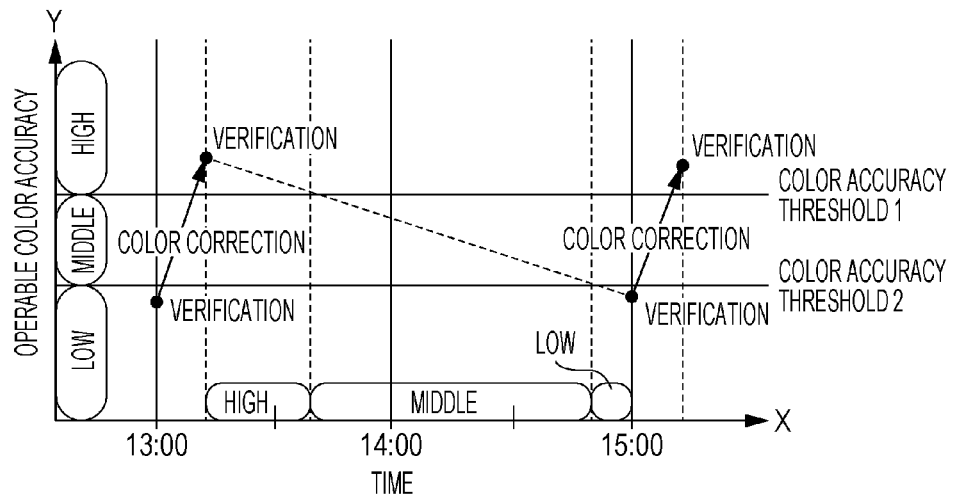
FIG. 5 is a diagram explaining time-varying changes in operable color accuracy.
FIG. 6 is a diagram illustrating an example of a classification method of the operable color accuracy.

In order to describe the above-mentioned embodiment of the present invention in more detail, a print control apparatus and a job processing control program, and a job processing control method according to an example of the present invention are described with reference to FIG. 1A to FIG. 29. FIGS. 1A and 1B are diagrams schematically illustrating the configuration of a printing system of the example. FIGS. 2A and 2B are block diagrams illustrating the configuration of a user terminal. FIGS. 3A and 3B are block diagrams illustrating the configuration of a print control apparatus. FIGS. 4A and 4B are a block diagram illustrating the configuration of a printing apparatus and a schematic diagram of a print processing unit. Moreover, FIG. 5 is a diagram explaining time-varying changes in operable color accuracy. FIG. 6 is a diagram illustrating an example of a classification method of the operable color accuracy. FIG. 7 is a diagram explaining job output control based on the color accuracy of the apparatus. Moreover, FIG. 8 is a table explaining the color accuracy level of the apparatus after color correction and a color correction effective time. FIGS. 9A, 9B, and 9C are tables illustrating examples of a job output order.

FIGS. 10A, 10B, and 10C are tables illustrating examples of the job output order and color correction execution timings. Moreover, FIGS. 11 to 20 are flowchart diagrams illustrating the processes of the print control apparatus of the example. FIGS. 21 and 22 are tables managed by the print control apparatus of the example. FIGS. 23 to 28 are data managed/used by the print control apparatus of the example. Moreover, FIG. 29 is an example of a message displayed on the user terminal.

As illustrated in FIG. 1A, in the printing system of the example, a user terminal 10, a print control apparatus 20, and a printing apparatus 30 that can be connected by a communication network are placed in an intranet. Ethernet (registered trademark) and the like can be used as the communication network standard. However, in addition to Ethernet (registered trademark), IEEE1394, Parallel, and the like can also be used for data transfer from the print control apparatus 20 to the printing apparatus 30. Moreover, in FIG. 1A, the print control apparatus 20 is provided separately from the printing apparatus 30. However, as illustrated in FIG. 1B, the print control apparatus 20 may be configured to be incorporated into the printing apparatus 30. The apparatuses are described hereinafter premised on the configuration of FIG. 1A.

[User Terminal]

The user terminal 10 is a computer apparatus such as a personal computer, and, for example, instructs the printing apparatus 30 via the print control apparatus 20 to print. The user terminal 10 is configured of a control unit 11, a storage unit 15, a network I/F unit 16, a display unit 17, an operating unit 18, and the like as illustrated in FIG. 2A.

The control unit 11 is configured of a CPU (Central Processing Unit) 12 and memory such as a ROM (Read Only Memory) 13 and a RAM (Random Access Memory) 14. The CPU 12 develops control programs stored in the ROM 13 and the storage unit 15 into the RAM 14 to execute the control programs, and accordingly controls the entire operation of the user terminal 10. Specifically, as illustrated in FIG. 2B, the control unit 11 executes programs of an OS (Operating System) 11a, a document creation application 11b, a printer driver 11c, and the like.

The OS 11a is Windows (registered trademark), Macintosh (registered trademark), or the like, and enables the document creation application 11b and the printer driver 11c to operate on the user terminal 10.

The document creation application 11b is software for text creation, spreadsheet, image processing, and the like. The document creation application 11b reads the printer driver 11c at the instruction to print, and transfers, to the printer driver 11c, document data created by the document creation application 11b.

The printer driver 11c converts the document data created by the document creation application 11b into a print job in a language that can be interpreted by the print control apparatus 20 (PDL (Page Description Language) data described in page description languages such as PJL (Printer Job Language), PS (Postscript), and PCL (Printer Control Language), or PDF (Portable Document Format) data). The printer driver 11c functions as a required color accuracy level setting unit and a delivery time setting unit, makes it possible to set the required color accuracy level and delivery time that are desired by a user on, for example, a print setting screen displayed by the printer driver 11c on the display unit 17, and adds the set required color accuracy level (and the delivery time if necessary) as print setting information to the print job.

The storage unit 15 is configured of an HDD (Hard Disk Drive), SSD (Solid State Drive), or the like. The storage unit 15 stores programs with which the CPU 12 controls the units, information related to the processing functions of the apparatus itself, document data created by the document creation application 11b, a print job created by the printer driver 11c (a print job in which the required color accuracy level and the delivery time are set), and the like.

The network I/F unit 16 is configured of a NIC (Network Interface Card), a modem, and the like. The network I/F unit 16 connects the user terminal 10 to the communication network, transmits a print job to the print control apparatus 20, acquires, from the print control apparatus 20, information of the printing apparatus 30 and a message described below, and the like.

The display unit 17 is configured of a liquid crystal display apparatus (LCD: Liquid Crystal Display) or organic EL (electroluminescence) display apparatus. The display unit 17 displays a document creation screen of the document creation application 11b, the print setting screen of the printer driver 11c, the message that notifies a user that print jobs of a delivery time group cannot be output within the delivery time, and the like.

The operating unit 18 is configured of a mouse, a keyboard, and the like. The operating unit 18 enables operations such as the creation of a document using the document creation application 11b, print settings using the printer driver 11c, the settings of the required color accuracy level and the delivery time, and an instruction about the above message.

[Print Control Apparatus]

The print control apparatus 20 is an apparatus that converts a print job received from the user terminal 10 into image data that can be processed by the printing apparatus 30. As illustrated in FIG. 3A, the print control apparatus 20 includes a control unit 21, a storage unit 25, a RIP (Raster Image Processor) unit 26, a network I/F unit 27, and a printer I/F unit 28, and if necessary, a display unit and an operating unit.

The control unit 21 is configured of a CPU 22 and memory such as a ROM 23 and a RAM 24. The CPU 22 develops control programs (including a job processing control program described below) stored in the ROM 23 and the storage unit 25 into the RAM 24 to execute the control programs, and accordingly controls the entire operation of the print control apparatus 20. The control unit 21 functions as a job management unit 21a, an apparatus management unit 21b, an output management unit 21c, and the like as illustrated in FIG. 3B.

The job management unit 21a manages print jobs. The job management unit 21a includes a job information reading unit and a job output time management unit.

The job information reading unit analyzes a print job and reads the required color accuracy level and the delivery time that are included in the print setting information.

The job output time management unit acquires the time required to output each print job (the number of pages×the number of copies/PPM (pages per minute), hereinafter referred to as the required time), and saves them in a table to manage them. The output of a print job indicates that the RIP unit 26 analyzes the print job, generates bitmap image data, and outputs the generated bitmap image data to the printing apparatus 30. Moreover, when the required time is calculated, IPM (images per minute) may be used instead of PPM. If post processing such as stapling, punching, and perfect binding is designated in the print setting information, the time required for the post processing may be added. Moreover, the required time of each individual print job may be retained in the table. An estimated time for each delivery time/required color accuracy level may be calculated and retained in the table. Moreover, the number of executions of color correction may be temporarily calculated and retained in the table.

The apparatus management unit 21b manages the printing apparatus 30. The apparatus management unit 21b includes a color accuracy degradation prediction unit, a color correction effective time management unit, and an apparatus color accuracy level change unit.

The color accuracy degradation prediction unit predicts the degradation of the color accuracy of the printing apparatus 30 based on the result of a color accuracy verification conducted in the printing apparatus 30 at predetermined time intervals. For example, as illustrated in FIG. 5, assume that the X axis indicates the time, the Y axis indicates the operable color accuracy, and the color accuracy changes linearly. The equation of a straight line passing two different points (x1, y1) and (x2, y2) can be obtained from the following equation. Accordingly, assuming that the time of the previous color accuracy verification is x1, the color accuracy of the time is y1, the time of the color accuracy verification of this time is x2, and the color accuracy of the time is y2, a linear equation (a broken line inclined downward to the right of FIG. 5) can be obtained.

$$y - y1 = (y2 - y1)/(x2 - x1) \times (x - x1) \quad (1)$$

The graph of time-varying changes in color accuracy (which is called a color accuracy degradation prediction graph) is not limited to a straight line but may be a curve. Moreover, the color accuracy degradation prediction graph may not be updated in real time. For example, an approximate curve obtained by measuring a sample by the printing apparatus 30 may be used. Moreover, what is obtained by multiplying a basic color accuracy degradation prediction graph by a correction coefficient may be used according to use conditions such as black/color, text/photograph, the amount of operation, morning/noon/night, and weather.

The color correction effective time management unit manages the time during which the color accuracy level of the printing apparatus 30 can be maintained (which is called a color correction effective time). Specifically, color accuracy thresholds 1 and 2 (refer to FIG. 5) are substituted into y of the above equation (1). The color correction effective time is obtained for each color accuracy level from the time corresponding to each color accuracy threshold, and saved in a table to be managed.

The apparatus color accuracy level change unit changes the operable color accuracy level of the printing apparatus 30 between, for example, high, middle, and low based on the table managed by the color correction effective time management unit. The operable color accuracy level may be set based on individual items such as ΔE (color difference) and ΔH (hue difference) illustrated in a table of FIG. 6, or may be set based on a plurality of items. In that case, the operable color accuracy level is required to be changed at the time when any of the items is no-go.

The output management unit 21c manages the output of a print job, a color correction execution request, and the like. The output management unit 21c includes a job output order change unit, a job output go/no-go determination unit, a color correction necessity/nonnecessity determination unit, a color correction request acceptance unit, and a message notification unit.

The job output order change unit changes the print job output order based on the table managed by the job management unit 21a and the table managed by the apparatus management unit 21b. For example, the job output order change unit sorts a plurality of print jobs waiting to be output in order of required color accuracy level from highest to lowest, or sorts a plurality of print jobs waiting to be output in order of delivery time from shortest to longest and sorts print jobs in the same delivery time groups in order of required color accuracy level from highest to lowest. Moreover, when outputting print jobs of a given delivery time group, the job output order change unit moves up a print job of the next delivery time group in the output order in each required color accuracy level within a range where the delivery time of the given delivery time group is met. If there is no print job at a required color accuracy level corresponding to the color accuracy level of the printing apparatus 30, a print job whose required color accuracy level is lower than the color accuracy level is moved up in the output order to delay the color correction execution timing.

The job output go/no-go determination unit compares the required color accuracy level of each print job and the color accuracy level of the printing apparatus 30 and, if the required color accuracy level of the print job is equal to or less than the color accuracy level of the printing apparatus 30 (for example, a job ID=1 of FIG. 7), outputs the print job and, if the required color accuracy level of the print job exceeds the color accuracy level of the printing apparatus 30 (for example, a job ID=2 of FIG. 7), does not output the print job and temporarily saves it as a standby job in the print control apparatus 20.

The color correction necessity/nonnecessity determination unit determines that a color correction is required if the required color accuracy levels of all print jobs waiting to be output exceed the color accuracy level of the printing apparatus 30, or if the print jobs waiting to be output include a print job whose required color accuracy level is equal to or less than the color accuracy level of the printing apparatus 30 but the delivery times of the print jobs cannot be met by moving up the print job whose required color accuracy level is equal to or less than the color accuracy level of the printing apparatus 30. The color correction is adjustments in the maximum densities of CMYK, an adjustment input/output curve of each color of CMYK, an adjustment in an input/output curve of a CMY mixed color gray, and the like. However, the color correction is simply required to be the process to improve the color accuracy.

The color correction request acceptance unit instructs the printing apparatus 30 (the own color correction unit if a color correction is executed by the own apparatus of the color correction request acceptance unit) to execute a color correction if the color correction necessity/nonnecessity determination unit has determined that a color correction is required.

The message notification unit transmits, to the user terminal 10 (or the printing apparatus 30), a message to the effect that print jobs in a given delivery time group cannot be output within a delivery time set for the given delivery time group if the planned process completion time of the print jobs exceeds the delivery time. The message notification unit causes the display unit 17 of the user terminal 10 (or a display operation unit 37 of the printing apparatus 30) to display the message or give the message by sound or the like to make the user aware of it.

The job management unit 21a, the apparatus management unit 21b, and the output management unit 21c may be configured as hardware. Alternatively, it may be configured as the job processing control program that causes the control unit 21 to function as the job management unit 21a, the apparatus management unit 21b, and the output management unit 21c, and configured to cause the control unit 21 (the CPU 22) to execute the job processing control program.

The storage unit 25 is configured of an HDD, SSD, or the like and stores programs with which the CPU 22 controls the units, information related to the processing functions of the apparatus itself, a print job received from the user terminal 10, image data generated by the RIP unit 26, tables and data referred to by the control unit 21 upon job processing control, and the like.

The RIP unit 26 translates PDL data to generate intermediate data, performs color conversion on the intermediate data using a color conversion table, does rendering, and generates bitmap image data (this series of processes is called a RIP process). Moreover, the RIP unit 26 performs screen processing, gradation correction, density balance adjustment, thinning, halftoning, and the like on the bitmap image data if necessary. The RIP unit 26 then outputs the generated bitmap image data to the printing apparatus 30 to cause the printing apparatus 30 to perform a printing process.

The network I/F unit 27 is configured of an NIC, a modem, and the like. The network I/F unit 27 enables communication with the user terminal 10, receives a print job from the user terminal 10, transmits a message to the user terminal 10, and the like. Moreover, the printer I/F unit 28 is configured of a NIC, a modem, and the like. The printer I/F unit 28 enables communication with the printing apparatus 30, transmits bitmap image data to the printing apparatus 30, receives the result of a color accuracy verification from the printing apparatus 30, and the like.

[Printing Apparatus]

The printing apparatus 30 is an image forming apparatus, such as an MFP, that prints a bitmap image received from the print control apparatus 20 on a designated sheet. The printing apparatus 30 includes a control unit 31, a storage unit 35, a controller I/F unit 36, the display operation unit 37, a print processing unit 38, a color accuracy verification unit 39, and a color correction unit 40 as illustrated in FIG. 4A.

The control unit 31 is configured of a CPU 32 and memory such as a ROM 33 and a RAM 34. The CPU 32 develops control programs stored in the ROM 33 and the storage unit 35 into the RAM 34 to execute the control programs, and accordingly controls the entire operation of the printing apparatus 30.

The storage unit 35 is configured of an HDD, SSD, or the like. The storage unit 35 stores programs with which the CPU 32 controls the units, information related to the processing functions of the apparatus itself, bitmap image data and print instruction information that are received from the print control apparatus 20, and the like.

The controller I/F unit 36 is configured of a NIC, a modem, and the like. The controller I/F unit 36 enables communication with the print control apparatus 20, receives bitmap image data and print instruction information from the print control apparatus 20, transmits the result of a color accuracy verification to the print control apparatus 20, and the like.

The display operation unit 37 is, for example, a touchscreen provided with a pressure-sensitive operating unit (a touch sensor) where transparent electrodes are arranged in a grid pattern on a display unit. The display operation unit 37 displays various screens related to printing processes to enable various operations related to printing.

The print processing unit 38 executes printing processes based on the bitmap image data. Specifically, as illustrated in FIG. 4B, the print processing unit 38 is configured of, for example, an image forming unit that includes exposure units that apply and expose to laser light based on the image data, photoconductor drums, developing units, charging units, photoconductor cleaning units, and primary transfer rollers, and that forms color toner images of CMYK, an intermediate belt that is rotated by rollers and functions as an intermediate transfer unit that conveys the toner images formed in the image forming unit onto a sheet, a secondary transfer roller that transfers the toner images formed on the intermediate belt onto the sheet, and a fixing unit that fixes the toner images transferred onto the sheet, and a conveyance unit including a paper feed roller, a paper stop roller, a loop roller, a reverse roller, and a paper discharge roller that conveys sheets. An inline sensor is provided, for example, on the sheet conveyance path between the fixing unit and a discharge tray. The inline sensor is configured of, for example, sensors of three kinds of RGB, and measures a color chart formed by the print processing unit 38 on a sheet and outputs the result as the measurement data.

The color accuracy verification unit 39 conducts a color accuracy verification at predetermined established time intervals or for each predetermined number of jobs, and notifies the result of the color accuracy verification to the print control apparatus 20. Specifically, the color accuracy verification unit 39 outputs a color correction-purpose chart where a color patch is placed, causes the inline sensor to measure the output color correction-purpose chart, compares color information of the color correction-purpose chart that theoretically should be output and the actual color value of the color correction-purpose chart measured by the inline sensor, obtains the amount of change in color, and verifies the color accuracy based on the amount of change in color.

The color correction unit 40 performs color adjustment (color management) such as adjustments in the maximum densities of CMYK, an adjustment in an input/output curve of each color of CMYK, and an adjustment in an input/ output curve of a CMY mixed color gray such that the amount of change in color calculated by the color accuracy verification unit 39 falls within an appropriate range.

FIG. 1A to FIG. 4B are examples of the printing system of the example. The configuration of each apparatus can be changed as appropriate as long as the job processing control of the example can be implemented.

For example, in the above description, it is configured such that the print control apparatus 20 is provided with the RIP unit 26, and the print control apparatus 20 rasterizes a print job. However, it maybe configured such that the printing apparatus 30 is provided with the RIP unit and the printing apparatus 30 rasterizes a print job. Moreover, in the above description, it is configured such that the printing apparatus 30 is provided with the color correction unit 40, and the printing apparatus 30 executes a color correction. However, it may be configured such that the print control apparatus 20 is provided with the color correction unit and the print control apparatus 20 executes a color correction. Moreover, in the above description, it is configured such that the printing apparatus 30 is provided with the inline sensor and color measurement data measured by the inline sensor is used to perform a color accuracy verification and a color correction. However, a color measurement of the color correction-purpose chart may be performed using an external colorimeter. In that case, the print control apparatus 20 (or the printing apparatus 30) is simply required to acquire color measurement data from the colorimeter and perform a color accuracy verification and a color correction.

Next, a description is given of the basic policy for the execution of a color correction and scheduling of output of jobs in the printing system with the above configuration.

FIG. 8 is a table illustrating the relationship between the elapsed time from a color correction, the color accuracy level of the printing apparatus 30 of the time, and the color correction effective time. In the example, assume that the color accuracy level of the apparatus is "high" for 30 minutes after the color correction, the color accuracy level of the apparatus is "middle" for the following 75 minutes (between 30 minutes and 105 minutes after the color correction), and the color accuracy level of the apparatus is "low" for the following 15 minutes (between 105 minutes and 120 minutes after the color correction). Assume that, in the state where the color correction has been made, five print jobs with job IDs=1 to 5 are in a state of waiting to be output as illustrated in FIG. 9A. A delivery time and a required color accuracy level that are desired by a user are preset for each print job.

Such print jobs are conventionally output in order of job ID. However, this method cannot satisfy the required color accuracy level desired by the user (the color accuracy level of the apparatus is "middle" at the start of outputting the job ID=5). Accordingly, the delivery time desired by the user cannot be met depending on the required times of the print jobs. Hence, in the example, the job output order change unit sorts the print jobs in such a manner as to make it possible to output a job at a high required color accuracy level in a state where the color accuracy of the apparatus is high while processing a print job with a short delivery time first.

Specifically, as illustrated in FIG. 9B, a plurality of print jobs is sorted by delivery time (rearranged in order of delivery time from shortest to longest). Print jobs of the same delivery times are sorted by required color accuracy level (rearranged in order of required color accuracy level from highest to lowest). The job output order is changed in this manner. Accordingly, it is possible to output a job at a high required color accuracy level in a state where the color accuracy of the apparatus is as high as possible while processing a job with a short delivery time first.

In the case of FIG. 9B, the output completion time of the print job with the job ID=1 and the elapsed time from the color correction is within 30 minutes. Accordingly, the print job can be output in a state where the color accuracy of the apparatus is "high." However, if the elapsed time from the color correction exceeds 30 minutes, it is necessary to execute the next color correction before the output of the print job with the job ID=1. Accordingly, the number of color corrections increases. The time required to complete the output of all the print jobs may be prolonged.

In such a case, in order to reduce the number of color corrections, a print job of a later delivery time group is moved up in each required color accuracy level within a range where the delivery time of a previous delivery time group can be met. For example, as illustrated in FIG. 9C, the print job with the job ID=1 whose required color accuracy level is "high" is moved up in the output order to be output after the print job with the job ID=5. Consequently, the timing to execute a color correction can be delayed.

A description is given hereinafter of how the print job output order and the color correction execution timing are changed by the control. For example, as illustrated in FIG. 10A, assume a case where four print jobs with job IDs=6 to 9 are added to the five print jobs of FIG. 9A. The time required for one color correction is 12 minutes including one minute for verification for checking the degree of degradation of color accuracy (one measurement chart), 10 minutes for color correction (approximately nine measurement charts), and one minute for the verification of the color correction effect (one measurement chart).

In the known method where jobs are output in order of job ID, 50 minutes has passed from the color correction at the point when the output of the job with the job ID=4 was completed. The color accuracy level of the apparatus is "middle." Accordingly, a print job whose required color accuracy level is "high" (the print job with the job ID=5) cannot be output. Hence, the second color correction is performed before the print job with the job ID=5. The job with the job ID=5 is then output. However, the next print job is also a print job whose required color accuracy level is "high" (the print job with the job ID=6). The total required time of both of the print jobs is 35 minutes, which exceeds the color correction effective time for the "high" color accuracy level of the apparatus. Accordingly, the third color correction is performed before the print job with the job ID=6. The job with the job ID=6 is then output. However, the next print job is also a print job whose required color accuracy level is "high" (the print job with the job ID=7). The total required time of both of the print jobs is 32 minutes, which exceeds the color correction effective time for the "high" color accuracy level of the apparatus. Accordingly, the fourth color correction is performed before the print job with the job ID=7. In this control, the print jobs with the job IDs=6 to 8 cannot be output within a desired delivery time (120 minutes). Moreover, the estimated output time to complete the output of all the print jobs is 200 minutes obtained by adding the time required for four color corrections (12×4=48 minutes) to the required times of the print jobs (5+10+15+20+15+20+12+25+30=152 minutes).

On the other hand, FIG. 10B illustrates a case (corresponding to the control of FIG. 9C) where in accordance with the job processing control method of the example, the nine print jobs with the job IDs=1 to 9 are sorted in order of delivery time from shortest to longest, print jobs of the same delivery time groups are then sorted in order of required color accuracy level from highest to lowest, and furthermore, a print job of the later delivery time group is moved up in each required color accuracy level within the range where the delivery time of the previous delivery time group can be met. In other words, the print job output order is basically the order of delivery time from shortest to longest and then the order of required color accuracy level from the highest to lowest. However, even if a print job belongs to the next delivery time group, as long as print jobs of the current delivery time group can be output within their delivery time, the print job of the next delivery time group is moved up and output.

In this case, the required color accuracy level of both of the print jobs with the job IDs=5 and 7 is "high." However, the total required time of both of the print jobs is 27 minutes, which is within the color correction effective time for the "high" color accuracy level of the apparatus. Accordingly, these print jobs are output without making a color correction. The second color correction is made before the next print job (the print job with the job ID=6). Similarly, the required color accuracy level of both of the print jobs with the job IDs=6 and 1 is "high." However, the total required time of both of the print jobs is 25 minutes, which is within the color correction effective time for the "high" color accuracy level of the apparatus. Accordingly, these print jobs are output without making a color correction. Moreover, the required color accuracy level of the job IDs=2, 8, 3, and 9 is "middle." The time when the output of these print jobs is completed is after the elapse of 105 minutes from the second color correction, which is within the color correction effective time for the "middle" color accuracy level of the apparatus. Accordingly, these print jobs are processed without making a color correction. The required color accuracy level of the next print job (the print job with the job ID=4) is "low." However, the required time of the print job is 20 minutes, which exceeds the color correction effective time for the "low" color accuracy level of the apparatus. Accordingly, the third color correction is made after the print job with the job ID=9. In this control, all the jobs can be output within their desired delivery times. Moreover, the estimated output time required to complete the output of all the print jobs can be reduced to 188 minutes obtained by adding the time required for three color corrections (12×3=36 minutes) to the required times of the print jobs (5+10+15+20+15+20+12+25+30=152 minutes).

FIG. 10C is an example of a case of further reducing the number of color corrections (a case of moving up, in the output order, a print job whose required color accuracy level is lower than the color accuracy level of the printing apparatus 30 if there is no print job that can be output at the color accuracy level). If print jobs whose required color accuracy levels are "middle" and "low" can be output even in a state where a print job whose required color accuracy level is "high" cannot be output, the print jobs whose required color accuracy levels are "middle" and "low" are moved up within a range where the delivery times can be met.

In this case, the required color accuracy level of both of the print jobs with the job IDs=5 and 7 is "high." However, the total required time of both of the print jobs is 27 minutes, which is within the color correction effective time for the "high" color accuracy level of the apparatus. Accordingly, both of the print jobs are output. A print job planned to be output next is the print job with the job ID=6. However, when the output of this print job is completed is after the elapse of 47 minutes from the color correction, which exceeds the color correction effective time for the "high" color accuracy level of the apparatus. However, the required color accuracy level of the print jobs with the job IDs=2 and 8 is "middle." When the output of these print jobs is completed is after the elapse of 62 minutes from the color correction, which is within the color correction effective time for the "middle" color accuracy level of the apparatus. Accordingly, the print jobs with the job IDs=2 and 8 are output first. The required color accuracy level of the print job with the job ID=3 is also "middle." Even if this print job is output, the output completion time is within the color correction effective time for the "middle" color accuracy level of the apparatus. However, if the print job is output first, the estimated output time of the print job with the job ID=6 exceeds its delivery time. Accordingly, the print job with the job ID=3 is not moved up. After the output of the print jobs with the job IDs=2 and 8, the second color correction is made. The print jobs with the job IDs=6, 1, 3, 9, and 4 are then output. In this control, all the print jobs can be output within their desired delivery times. Furthermore, the estimated output time to complete the output of all the print jobs can be reduced to 176 minutes obtained by adding the time required for two color corrections (12×2=24 minutes) to the required times of the print jobs (5+10+15+20+15+20+12+25+30=152 minutes).

In this manner, a plurality of print jobs is sorted in order of delivery time from shortest to longest. Print jobs of the same delivery times are sorted in order of required color accuracy level from highest to lowest. Furthermore, a print job of a later delivery time group is moved up in the output order in each required color accuracy level within a range where the delivery time of the previous delivery time group can be met, or if there is no print job at a required color accuracy level corresponding to the color accuracy level of the printing apparatus 30, for example, a print job at a required color accuracy level that is lower than the color accuracy level of the printing apparatus 30 is moved up in the output order. Accordingly, it is possible to reduce the number of executions of color correction and reduce the estimated output time when the output of all the print jobs is completed while meeting delivery times and required color accuracy levels that are desired by users.

Figure 19:
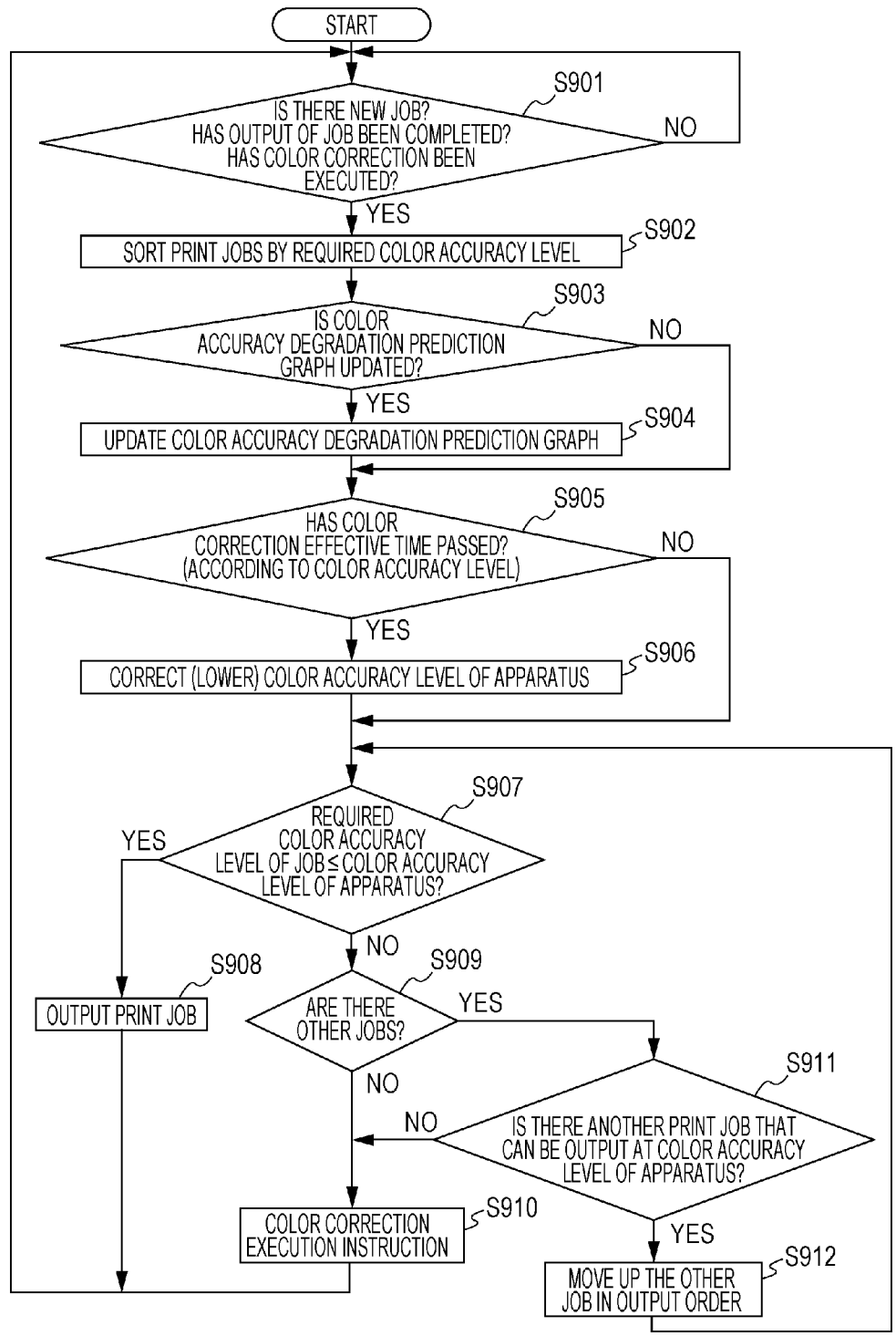
FIG. 19 is a flowchart diagram illustrating an example of the processes (the processes in a case of controlling the job output order based on the required color accuracy level) of the print control apparatus according to an example of the present invention.
Figure 20:
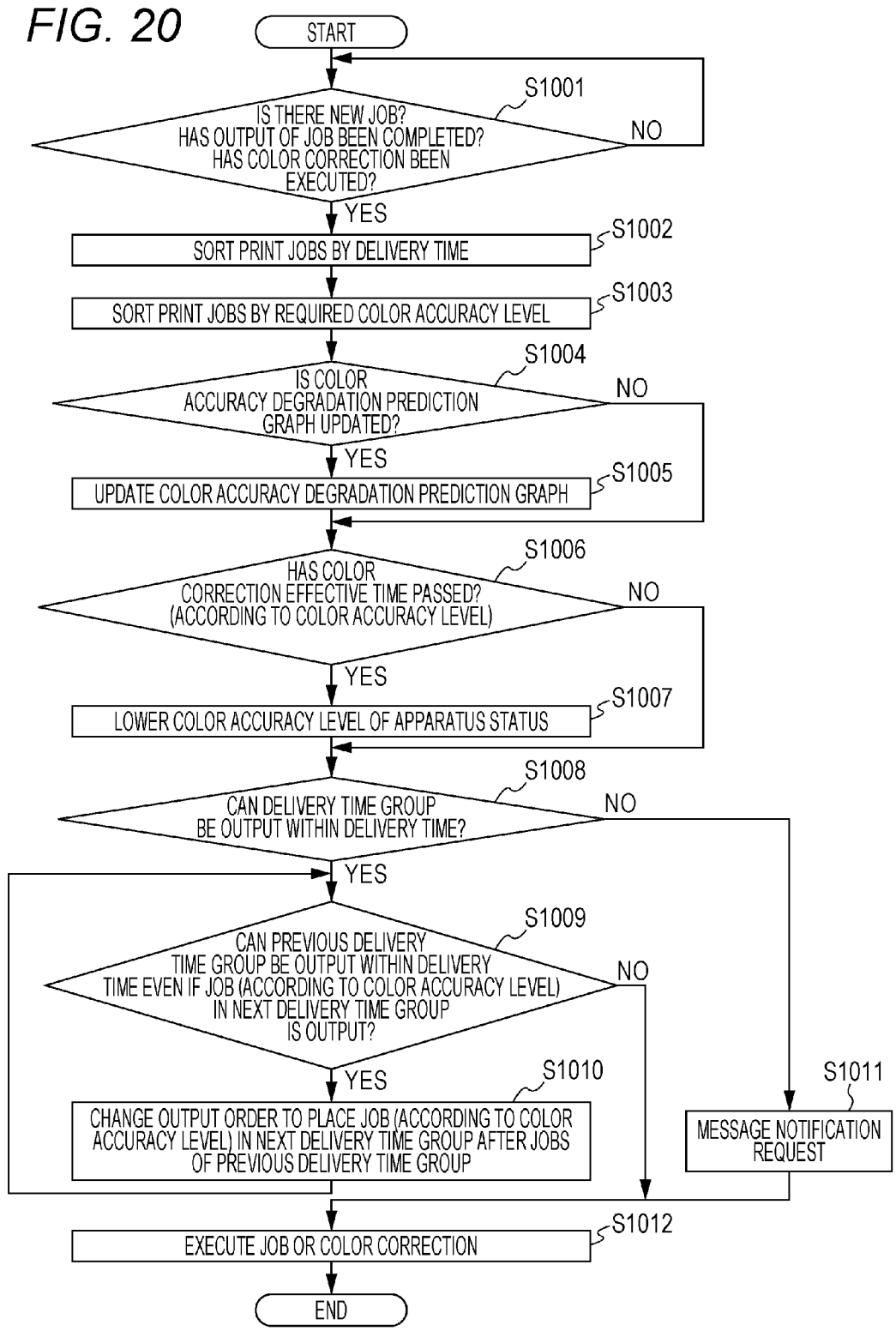
FIG. 20 is a flowchart diagram illustrating an example of the processes (the processes in a case of controlling the job output order based on the delivery time and the required color accuracy level) of the print control apparatus according to an example of the present invention.

Next, a specific processing procedure of the print control apparatus 20 is described. The CPU 22 develops the job processing control program stored in the ROM 23 or the storage unit 25 into the RAM 24 to execute the job processing control program. Accordingly, a process of each step illustrated in the flowchart diagrams of FIGS. 11 to 20 is executed. FIGS. 11 to 18 are the flowchart diagrams illustrating the processes of each individual unit. FIGS. 19 and 20 are the flowchart diagrams illustrating processes of a case where the units operate together.

Firstly, the processes of each individual unit are described.

Figure 11:
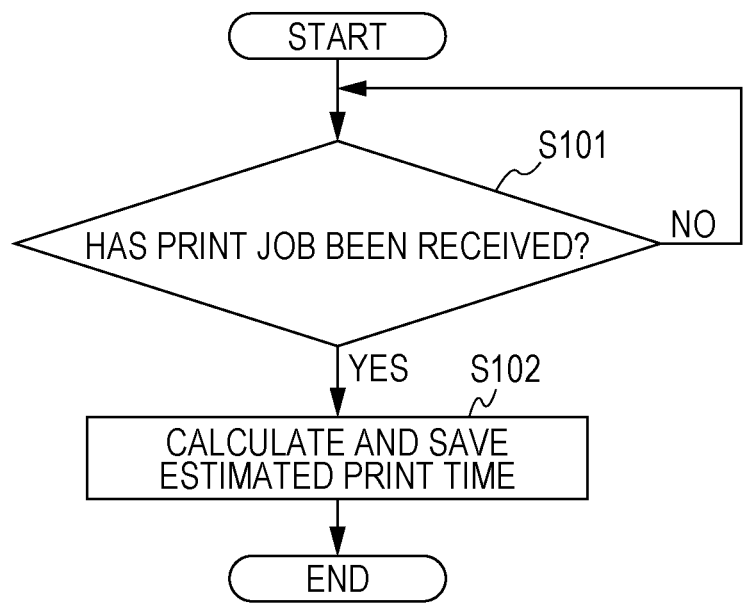
FIG. 11 is a flowchart diagram illustrating the processes of a job output time management unit of the print control apparatus according to an example of the present invention.

FIG. 11 illustrates the processes of the job management unit 21a (the job output time management unit). The job output time management unit determines whether or not to have received a print job (S101), and calculates an estimated total print time (the total of required times of print jobs at each required color accuracy level) after having received the print job. The job output time management unit creates, for example, such a table as illustrated in FIG. 21, and saves the table in the storage unit 25 or the like (S102). It is preferable to refer to the current color correction effective time managed by the color correction effective time management unit, calculate a temporary number of color corrections, and describes it in the table.

Figure 12:
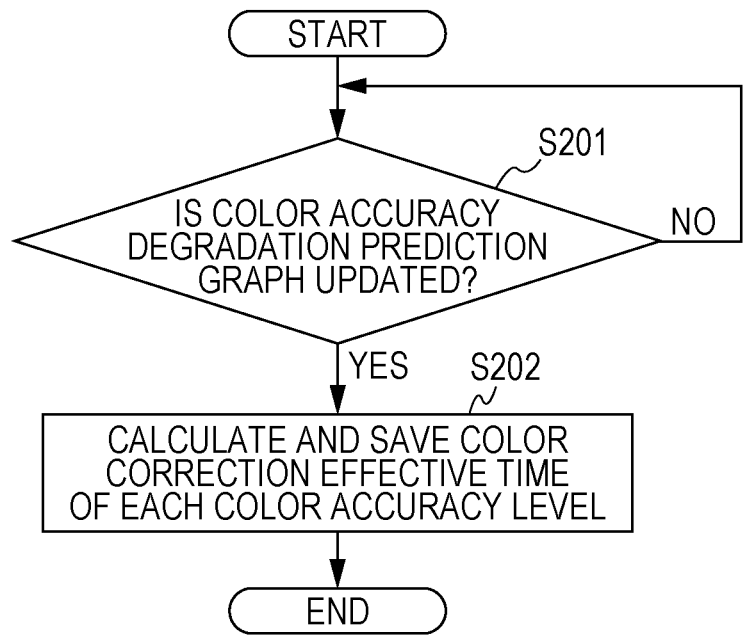
FIG. 12 is a flowchart diagram illustrating the processes of a color correction effective time management unit of the print control apparatus according to an example of the present invention.

FIG. 12 illustrates the processes of the apparatus management unit 21b (the color correction effective time management unit). The color correction effective time management unit determines whether or not the color accuracy degradation prediction unit has updated the color accuracy degradation prediction graph (S201), and calculates a color correction effective time in each color accuracy level of the printing apparatus 30 when the color accuracy degradation prediction graph has been updated. The color correction effective time management unit creates, for example, such a table as illustrated in FIG. 22, and saves the table in the storage unit 25 or the like (S202).

Figure 13:
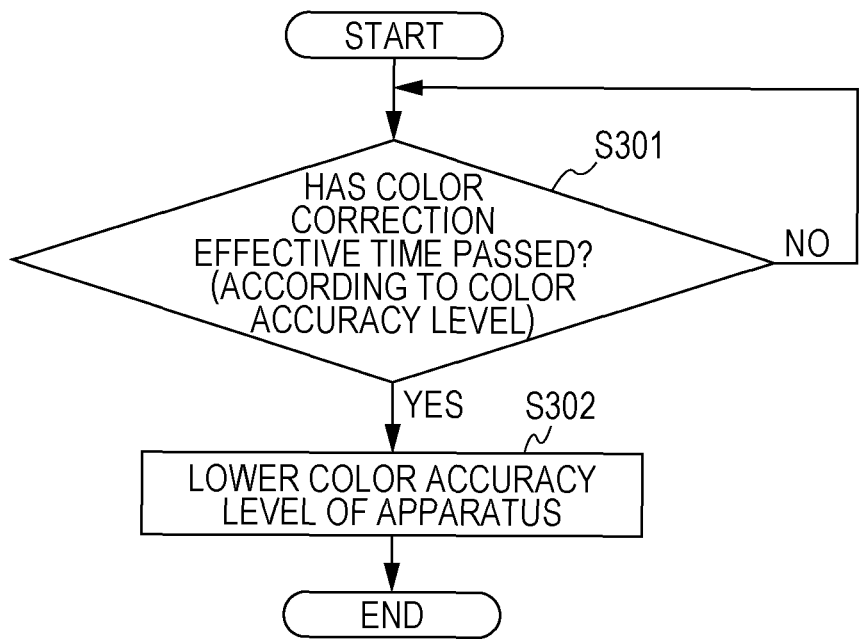
FIG. 13 is a flowchart diagram illustrating the processes of an apparatus color accuracy level change unit of the print control apparatus according to an example of the present invention.

FIG. 13 illustrates the processes of the apparatus management unit 21b (the apparatus color accuracy level change unit). The apparatus color accuracy level change unit determines, in each color accuracy level, whether or not the color correction effective time has passed (S301) and, if the color correction effective time has passed, lowers the color accuracy level of the printing apparatus 30 (S302).

Figure 14:
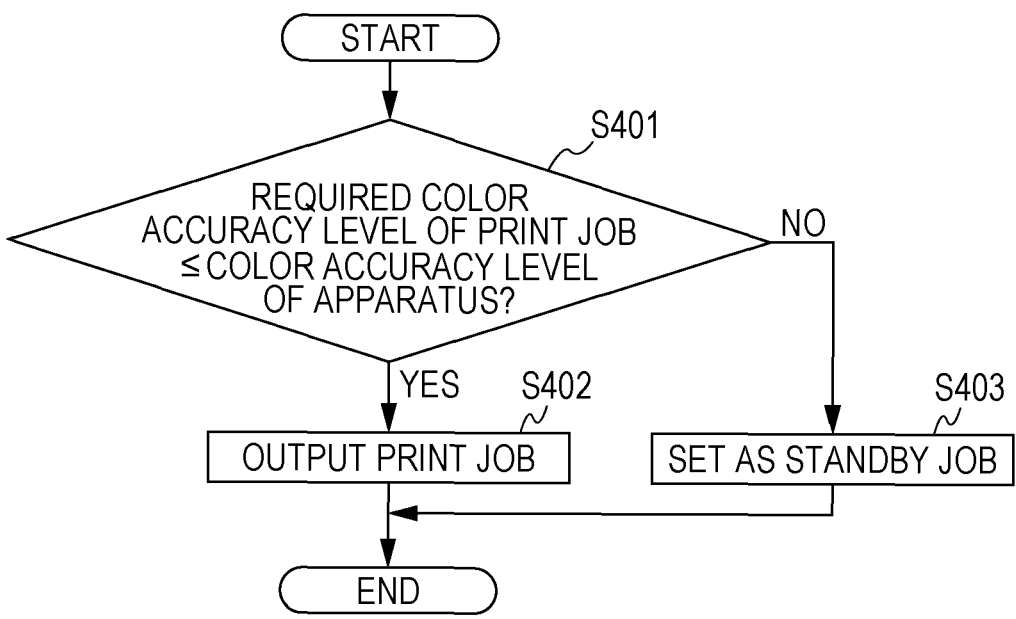
FIG. 14 is a flowchart diagram illustrating the processes of a job output go/no-go determination unit of the print control apparatus according to an example of the present invention.

FIG. 14 illustrates the processes of the output management unit 21c (the job output go/no-go determination unit). The job output go/no-go determination unit determines whether or not the required color accuracy level of the print job is equal to or less than the color accuracy level of the printing apparatus 30 (S401). If the required color accuracy level of the print job is equal to or less than the color accuracy level of the printing apparatus 30, the job output go/no-go determination unit outputs the print job (S402) and, if the required color accuracy level of the print job exceeds the color accuracy level of the printing apparatus 30, does not output the print job and set it as a standby job (S403).

Figure 15:
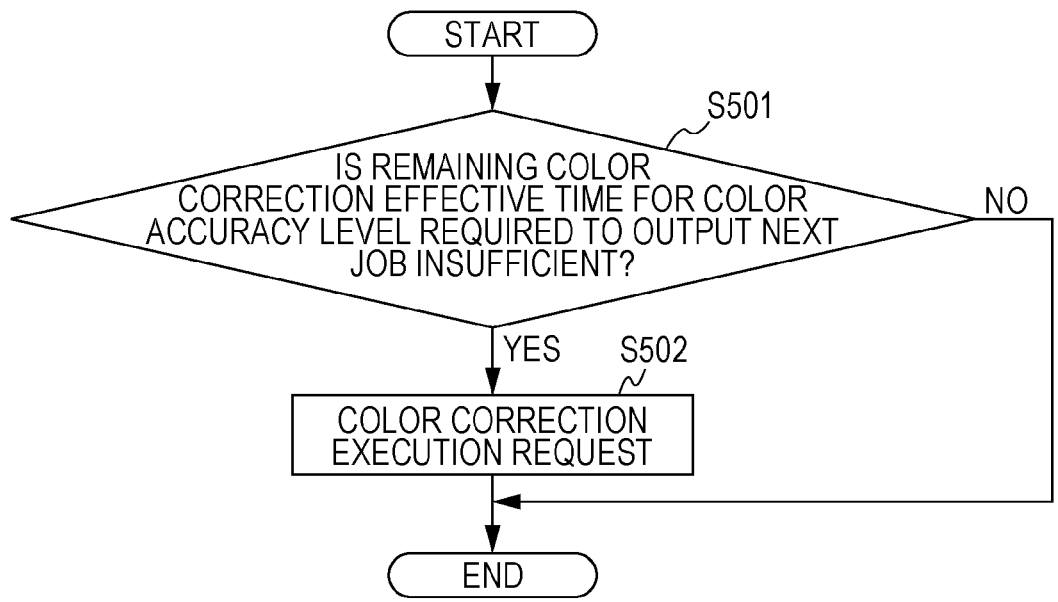
FIG. 15 is a flowchart diagram illustrating the processes of a color correction necessity/nonnecessity determination unit of the print control apparatus according to an example of the present invention.

FIG. 15 illustrates the processes of the output management unit 21c (the color correction necessity/nonnecessity determination unit). The color correction necessity/nonnecessity determination unit uses, for example, data illustrated in FIG. 23 to determine whether or not the remaining color correction effective time for a color accuracy level necessary to output the next job is insufficient (S501). Specifically, the color correction necessity/nonnecessity determination unit determines that a color correction is required before the execution of the next job if the remaining color correction effective time (three minutes in this example) for the required color accuracy level ("high" in the example of FIG. 23) of the next job is less than the required print time (20 minutes in this example) of the next job. The color correction necessity/nonnecessity determination unit requests the color correction request acceptance unit to execute a color correction if the remaining color correction effective time is insufficient (S502).

Figure 16:
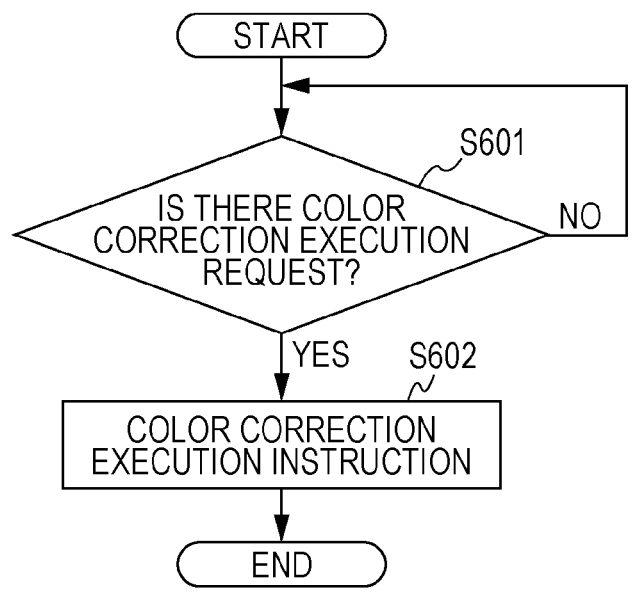
FIG. 16 is a flowchart diagram illustrating the processes of a color correction request acceptance unit of the print control apparatus according to an example of the present invention.

FIG. 16 illustrates the processes of the output management unit 21c (the color correction request acceptance unit). The color correction request acceptance unit determines whether or not the color correction necessity/nonnecessity determination unit has made a color correction execution request (S601) and, if a color correction execution request has been made, instructs the printing apparatus 30 to execute a color correction (S602).

Figure 17:
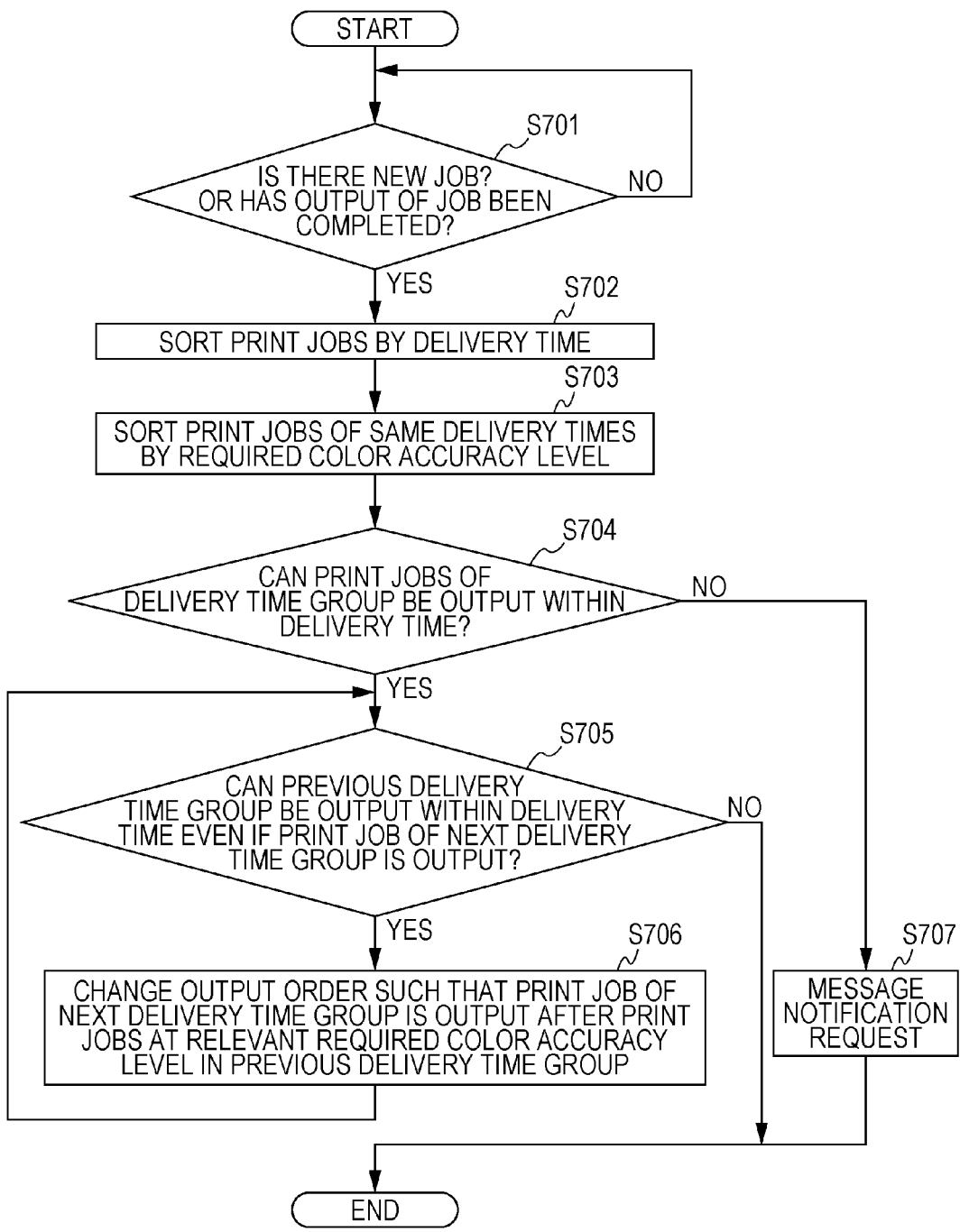
FIG. 17 is a flowchart diagram illustrating the processes of a job output order change unit of the print control apparatus according to an example of the present invention.

FIG. 17 illustrates the processes of the output management unit 21c (the job output order change unit). The job output order change unit determines whether or not there is a new job or the output of a job has been completed (S701). The reason to determine whether or not the output of a job has been completed is that the job output order may be changed due to the completion of the output of the job. If there is a new job or the output of a job has been completed, the job output order change unit sorts print jobs waiting to be output (standby jobs) in order of delivery time from shortest to longest (S702), and then sorts print jobs of the same delivery time groups in order of required color accuracy level from highest to lowest (S703).

Next, the job output order change unit determines whether or not all print jobs of a delivery time group can be output within their delivery time (S704). Specifically, the job output order change unit manages data on color correction operations of FIG. 24. The job output order change unit refers to data of FIG. 25 created based on the data on the color correction operations and data of FIG. 21 managed by the job output time management unit, calculates a total estimated print time, the total time of each delivery time group+(the number of executions of color correction of each delivery time group×an estimated color correction operation time), and determines whether or not the value is equal to or less than the delivery time.

For example, in a case of jobs of a delivery time of 120 minutes, $$(47+35+0)+2\times(1+10+1)=106<120.$$

Accordingly, branching to Yes of S704 occurs. Moreover, in a case of jobs of a delivery time of 240 minutes, $$(5+45+20)+1\times(1+10+1)=82<120.$$

Accordingly, branching to Yes of S704 occurs. If it has been determined that the jobs cannot be output within the delivery time, the message notification unit is requested to give a message prompting a change of the required color accuracy level and the transfer of the jobs to another apparatus (S707).

If having determined that all jobs of a delivery time group can be output within their delivery time, the job output order change unit determines, according to the required color accuracy level, whether or not print jobs of the previous delivery time group can be output within their delivery time even if a print job of the next delivery time group is output (S705) and, if having determined that they can be output, the print job output order is changed such that the print job of the next delivery time group is output after the print jobs of the previous delivery time group at the relevant required color accuracy level (S706).

For example, from data of FIGS. 26 and 27, it is checked whether or not a print job whose required color accuracy level is "high" in the next delivery time group can be output since the remaining time for the "high" color accuracy level of the printing apparatus 30 is 10 minutes when the output of jobs of the "high" required color accuracy level in the delivery time 120-minute group is completed. The next delivery time group is searched for a print job whose required color accuracy level is "high" and whose required time is within 10 minutes. If there is an applicable print job, it is determined whether or not the time does not exceed 120 minutes of the delivery time even if the required time of the print job is added. If it does not exceed 120 minutes of the delivery time, a change is made to place the print job at the end of the print jobs whose required color accuracy level is "high" in the delivery time 120-minute group (here, after the job ID=6). FIG. 28 illustrates the changed job output order. The print job with the job ID=1 is moved up compared to a table of FIG. 27. Furthermore, if there is a print job whose required color accuracy level is "high" that can be output within the remaining five minutes, a change is made to place it at the end of the print jobs whose required color accuracy level is "high" in the delivery time 120-minute group (not applicable in this example). Execution exits from the loop the second time in this example. However, the check of S705 is similarly carried out also for those whose required color accuracy levels are "middle" and "low." For example, the remaining color correction effective time for the "low" color accuracy level of the apparatus is 15 minutes after the output of the print job with the job ID=9. Accordingly, if an unillustrated delivery time 360-minute group contains a print job whose required color accuracy level is "low" and whose required time is equal to or less than 15 minutes, the print job is moved up to after the job ID=9.

Figure 18:
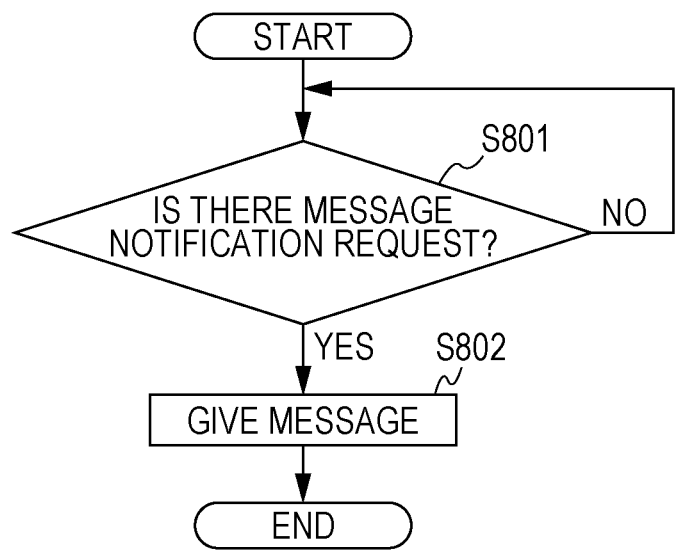
FIG. 18 is a flowchart diagram illustrating the processes of a message notification unit of the print control apparatus according to an example of the present invention.

FIG. 18 illustrates the processes of the output management unit 21c (the message notification unit). When having received a message notification request from the job output order change unit (Yes in S801), the message notification unit gives the user terminal 10 a message prompting a change of the required color accuracy level, and the transfer of jobs to another apparatus (S802). For example, when the required time of the print job with the job ID=2 exceeds 24 minutes in the table of FIG. 10B, even if a lower priority is given to the print job with the job ID=1, the print jobs of the delivery time 120 minutes cannot be output within the delivery time. Accordingly, a message is given to the user terminal 10. Such a message as illustrated in FIG. 29 is displayed. Consequently, a user can take various steps.

Up to this point the processes of each individual unit have been described. A case where the units operate together is now described. Methods where the print job output order is controlled by causing the units to operate together include a method where the print job output order is temporarily set and each print job is determined whether or not to be outputtable whenever it is output, and a method where the print job output order is determined and print jobs are output in accordance with the output order. The former method is effective when print jobs whose delivery times are not set are sequentially placed. The latter method is effective when print jobs whose delivery times are set are placed together. Hence, in FIG. 19, a description is given of a case where print jobs whose delivery times are not set (only required color accuracy levels are set) are controlled by the former method. In FIG. 20, a description is given of a case where print jobs whose delivery times, together with required color accuracy levels, are set are controlled by the latter method.

Firstly, the case where delivery times are not set for print jobs (only required color accuracy levels are set) is described with reference to the flowchart diagram of FIG. 19.

Firstly, the control unit 21 determines whether or not there is a new job, the output of a job has been completed, and a color correction has been executed (S901). The reason to determine whether or not the output of a job has been completed and whether or not a color correction has been executed is that the job output order may be changed due to the completion of the output of the job and the execution of a color correction.

If there is a new job, the output of a job has been completed, or a color correction has been executed, the output management unit 21c (the job output order change unit) sorts print jobs waiting to be output in order of required color accuracy level from highest to lowest (S902). At this point in time, if there is a new job, the job management unit 21a (the job information reading unit) refers to the print setting information of the print job, and the like, and reads the required color accuracy level. Moreover, the job management unit 21a (the job output time management unit) calculates the required time of each print job describes them in the table, and saves them in the storage unit 25 or the like.

Next, the apparatus management unit 21b (the color accuracy degradation prediction unit) determines whether or not to update the previously created color accuracy degradation prediction graph (S903). For example, if the printing apparatus 30 has conducted a color verification, the color accuracy degradation prediction unit updates the color accuracy degradation prediction graph (S904), and makes it possible to appropriately determine the color accuracy level of the printing apparatus 30. The apparatus management unit 21b (the color correction effective time management unit) then refers to the color accuracy degradation prediction graph, calculates color correction effective times according to the color accuracy levels of the printing apparatus 30, describes them in the table, and saves them in the storage unit 25 or the like.

Next, the apparatus management unit 21b (the color correction effective time management unit) determines, according to the color accuracy level of the printing apparatus 30, whether or not the color correction effective time has passed (S905). If the color correction effective time has passed, the apparatus management unit 21b (the apparatus color accuracy level change unit) corrects the color accuracy level of the printing apparatus 30 (lowers the level) (S906).

Next, the output management unit 21c (the job output go/no-go determination unit) compares the required color accuracy level of a print job target to be output and the color accuracy level of the printing apparatus 30 (S907) and, if the required color accuracy level of the print job is equal to or less than the color accuracy level of the printing apparatus 30 (Yes in S907), outputs the print job to the printing apparatus 30 (S908), returns to S901, and performs similar processes on print jobs waiting to be output.

On the other hand, if the required color accuracy level of the print job is higher than the color accuracy level of the printing apparatus 30 (No in S907), the print job cannot be output. In that case, a color correction can be executed immediately. However, when there is a print job that can be output at the printing apparatus 30's color accuracy level of the time, the number of executions of color correction can be further reduced if the print job is output first. Hence, the output management unit 21c (the job output go/no-go determination unit) determines whether or not there are other print jobs waiting to be output (S909). If there are no other jobs, the output management unit 21c (the color correction necessity/nonnecessity determination unit) makes a color correction execution request. The output management unit 21c (the color correction request acceptance unit) accepts the color correction execution request from the color correction necessity/nonnecessity determination unit and instructs the printing apparatus 30 to execute a color correction (S910).

Moreover, if there are other print jobs, the output management unit 21c (the job output go/no-go determination unit) determines whether or not the other print jobs include a print job that can be output at the color accuracy level of the printing apparatus 30 (S911). If there is a print job that can be output at the color accuracy level of the printing apparatus 30 as the result of the determination, the output management unit 21c (the job output order change unit) moves up the print job in the output order (S912), and returns to S907 to repeat similar processes. On the other hand, if there is no print job that can be output at the color accuracy level of the printing apparatus 30, the output management unit 21c (the color correction necessity/nonnecessity determination unit) makes a color correction execution request. The output management unit 21c (the color correction request acceptance unit) accepts the color correction execution request from the color correction necessity/nonnecessity determination unit and instructs the printing apparatus 30 to execute a color correction (S910).

In this manner, print jobs waiting to be output are sorted in order of required color accuracy level from highest to lowest. Accordingly, jobs whose required color accuracy level is high can be effectively output. Moreover, when the required color accuracy level of a print job is higher than the color accuracy level of the printing apparatus 30, if another print job can be output, it is moved up in the output order. Accordingly, the number of executions of color correction can be effectively reduced.

Next, the case where delivery times together with required color accuracy levels are set for print jobs is described with reference to the flowchart diagram of FIG. 20.

Firstly, the control unit 21 determines whether or not there is a new job, the output of a job has been completed, or a color correction has been executed (S1001). If there is a new job, the output of a job has been completed, or a color correction has been executed, the output management unit 21*c* (the job output order change unit) sorts print jobs waiting to be output in order of delivery time from shortest to longest (S1002), and then sorts print jobs of the same delivery time groups in order of required color accuracy level from highest to lowest (S1003). At this point in time, if there is a new job, the job management unit 21*a* (the job information reading unit) refers to the print setting information of the print job, and the like to read the required color accuracy level and the delivery time. Moreover, the job management unit 21*a* (the job output time management unit) calculates the required time of each print job, describes them in the table (refer to FIG. 21), and saves them in the storage unit 25 or the like. Moreover, a temporary number of color corrections is obtained with reference to the color correction effective time for each of the previously stored color accuracy levels of the apparatus to describe them in the table. Accordingly, a determination can be accurately made on whether or not output can be performed within a delivery time described below.

Next, the apparatus management unit 21*b* (the color accuracy degradation prediction unit) determines whether or not to update the previously created color accuracy degradation prediction graph (S1004). For example, when the printing apparatus 30 has conducted a color verification, the color accuracy degradation prediction unit updates the color accuracy degradation prediction graph (S1005), and makes it possible to appropriately determine the color accuracy of the printing apparatus 30. The apparatus management unit 21*b* (the color correction effective time management unit) refers to the color accuracy degradation prediction graph, calculates color correction effective times according to the color accuracy levels of the printing apparatus 30, describes them in the table (refer to FIG. 22), and saves them in the storage unit 25 or the like.

Next, the apparatus management unit 21*b* (the color correction effective time management unit) determines, according to the color accuracy level of the printing apparatus 30, whether or not the color correction effective time has passed (S1006). If the color correction effective time has passed, the apparatus management unit 21*b* (the apparatus color accuracy level change unit) corrects the color accuracy level of the printing apparatus 30 (lowers the level) (S1007).

Next, the output management unit 21*c* (the job output go/no-go determination unit) refers to the tables of FIGS. 21 and 22, and determines whether or not all print jobs in a delivery time group can be output within the delivery time (S1008). It if has been determined that the print jobs in the delivery time group cannot be output within the delivery time, the output management unit 21*c* (the message notification unit) transmits the message illustrated in FIG. 29 to the user terminal 10, and causes the display unit 17 or the like to display the message (S1011).

If it has been determined that all the jobs in the delivery time group can be output within the delivery time, the output management unit 21*c* (the job output order change unit) determines, according to the required color accuracy level, whether or not print jobs of the previous delivery time group can be output within the delivery time even if a print job of the next delivery time group is output (S1009). If it has been determined that the print jobs cannot be output within the delivery time of the previous delivery time group, the output of all the print jobs of the previous delivery time group and a color correction are executed (S1012).

On the other hand, if it has been determined that the print jobs can be output within the delivery time of the previous delivery time group even if the print job of the next delivery time group is output, the output management unit 21*c* (the job output order change unit) changes the print job output order such that the print job of the next delivery time group is output after print jobs at the relevant required color accuracy level in the previous delivery time group (S1010). Return to S1009 afterwards. Similar processes are performed on the next print job of the next delivery time group.

In this manner, jobs waiting to be output are sorted in order of delivery time from shortest to longest, and then print jobs of the same delivery time groups are sorted in order of required color accuracy level from highest to lowest. Accordingly, print jobs whose required color accuracy level is high can be effectively output while the delivery times are met. Moreover, a print job of a later delivery time group is moved up in the output order in each required color accuracy level within a range where the delivery time of a previous delivery time group can be met. Accordingly, the number of executions of color correction can be effectively reduced.

The present invention is not limited to the above example. The configuration and control of the present invention can be changed as appropriate unless the changes do not depart from the gist of the present invention.

For example, in the above example, the case where the printing apparatus 30 executes a color accuracy verification and a color correction is described. However, the job processing control of the present invention can be similarly applied also to a case where the print control apparatus 20 executes a color accuracy verification and/or a color correction.

The present invention can be used for a print control apparatus that controls a printing apparatus including a color correction function and a job processing control program that operates on the print control apparatus, and a recording medium in which the job processing control program is recorded, and a job processing control method in a printing system including the printing apparatus and the print control apparatus.

According to the print control apparatus and the job processing control program, and the job processing control method of an embodiment of the present invention, the output of a print job can be appropriately controlled in accordance with the color accuracy required for the print job.

The reason is that the print control apparatus (the job processing control program) that controls a printing apparatus that can execute a color accuracy verification and a color correction acquires a required color accuracy level preset for a print job, and also calculates the required time of the print job, predicts the degradation of the color accuracy of the printing apparatus based on the result of the color accuracy verification, calculates a color correction effective time according to the color accuracy level of the printing apparatus, and sets the output order of a plurality of print jobs waiting to be output and a color correction execution timing based on the required color accuracy level, the required time of the print job, the color correction effective time according to the color accuracy level of the printing apparatus.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A print control apparatus for controlling a printing apparatus configured to calculate the amount of change between a designated color and a color measured by printing a patch of the designated color, and be capable of executing a color accuracy verification for verifying color accuracy based on the amount of change in color, and a color correction for adjusting a color to be printed such that the amount of change in color falls within a predetermined range, the print control apparatus comprising:
   a job management unit configured to analyze a print job and acquire a required color accuracy level specifying color accuracy required for the print job, the required color accuracy level being preset in the print job, and also calculate and manage a required time of the print job;
   an apparatus management unit configured to acquire a result of the color accuracy verification from the printing apparatus, predict the degradation of the color accuracy of the printing apparatus based on the result, and calculate and manage a color correction effective time according to the color accuracy level of the printing apparatus; and
   an output management unit configured to set the output order of a plurality of print jobs waiting to be output and the execution timing of the color correction based on the required color accuracy level, the required time of the print job, and the color correction effective time according to the color accuracy level of the printing apparatus, and instruct the printing apparatus to execute the processing of the print job and the color correction.

2. The print control apparatus according to claim 1, wherein the output management unit rearranges the plurality of print jobs waiting to be output in order of the required color accuracy level from highest to lowest and, upon the required color accuracy level of a print job targeted to be output being equal to or less than the color accuracy level of the printing apparatus, determines that the print job targeted to be output is outputtable.

3. The print control apparatus according to claim 2, wherein the output management unit determines that the color correction is required upon the plurality of jobs waiting to be output including no print job whose required color accuracy level is equal to or less than the color accuracy level of the printing apparatus.

4. The print control apparatus according to claim 1, wherein
   the job management unit acquires a delivery time preset in the print job, and
   the output management unit rearranges the plurality of print jobs waiting to be output in order of delivery time from shortest to longest, and further rearranges print jobs of the same delivery time groups in order of the required color accuracy level from highest to lowest.

5. The print control apparatus according to claim 4, wherein upon print jobs of a predetermined delivery time group being outputtable within the predetermined delivery time, the output management unit determines, according to the required color accuracy level, whether or not the print jobs of the predetermined delivery time group are outputtable within the predetermined delivery time even if a print job of the next delivery time group is output after print jobs at the same required color accuracy level in the predetermined delivery time group, and upon having determined to be outputtable, moves up the print job of the next delivery time group in the output order such that the print job of the next delivery time group is output after print jobs at the same required color accuracy level in the predetermined delivery time group.

6. The print control apparatus according to claim 5, wherein upon having determined that the print jobs of the predetermined delivery time group are not outputtable within the predetermined delivery time, the output management unit outputs a message that notifies the determination to a user.

7. A non-transitory recording medium storing a computer readable job processing control program to operate on a print control apparatus for controlling a printing apparatus configured to calculate the amount of change between a designated color and a color measured by printing a patch of the designated color, and be capable of executing a color accuracy verification for verifying color accuracy based on the amount of change in color, and a color correction for adjusting a color to be printed such that the amount of change in color falls within a predetermined range, the job processing control program causing the print control apparatus to execute:
   a first process of analyzing a print job and acquiring a required color accuracy level specifying color accuracy required for the print job, the required color accuracy level being preset in the print job, and also calculating and managing a required time of the print job;
   a second process of predicting the degradation of the color accuracy of the printing apparatus based on a result of the color accuracy verification, and calculating and managing a color correction effective time according to the color accuracy level of the printing apparatus; and
   a third process of setting the output order of a plurality of print jobs waiting to be output and the execution timing of the color correction based on the required color accuracy level, the required time of the print job, and the color correction effective time according to the color accuracy level of the printing apparatus.

8. The non-transitory recording medium storing a computer readable job processing control program according to claim 7, wherein in the third process, the plurality of print jobs waiting to be output are rearranged in order of the required color accuracy level from highest to lowest and, upon the required color accuracy level of a print job targeted to be output being equal to or less than the color accuracy level of the printing apparatus, it is determined that the print job targeted to be output is outputtable.

9. The non-transitory recording medium storing a computer readable job processing control program according to claim 8, wherein in the third process, it is determined that the color correction is required upon the plurality of jobs waiting to be output including no print job whose required color accuracy level is equal to or less than the color accuracy level of the printing apparatus.

10. The non-transitory recording medium storing a computer readable job processing control program according to claim 7, wherein
  in the first process, a delivery time preset in the print job is acquired, and
  in the third process, the plurality of print jobs waiting to be output is rearranged in order of delivery time from shortest to longest, and further print jobs of the same delivery time groups are rearranged in order of the required color accuracy level from highest to lowest.

11. The non-transitory recording medium storing a computer readable job processing control program according to claim 10, wherein upon print jobs of a predetermined delivery time group being outputtable within the predetermined delivery time, in the third process it is determined, according to the required color accuracy level, whether or not the print jobs of the predetermined delivery time group are outputtable within the predetermined delivery time even if a print job of the next delivery time group is output and, upon having determined to be outputtable, the print job of the next delivery time group is moved up in the output order such that the print job of the next delivery time group is output after print jobs at the same required color accuracy level in the predetermined delivery time group.

12. The non-transitory recording medium storing a computer readable job processing control program according to claim 11, wherein upon having determined that the print jobs of the predetermined delivery time group are not outputtable within the predetermined delivery time, in the third process a message that notifies the determination to a user is output.

13. A job processing control method in a printing system where a printing apparatus configured to calculate the amount of change between a designated color and a color measured by printing a patch of the designated color, and be capable of executing a color accuracy verification for verifying color accuracy based on the amount of change in color, and a color correction for adjusting a color to be printed such that the amount of change in color falls within a predetermined range, a print control apparatus configured to control the printing apparatus, and a user terminal configured to transmit a print job to the print control apparatus are connected to a communication network, the job processing control method causing the print control apparatus to execute:
  a first process of analyzing the print job received from the user terminal and acquiring a required color accuracy level specifying color accuracy required for the print job, the required color accuracy level being preset in the print job, and also calculating and managing a required time of the print job;
  a second process of acquiring a result of the color accuracy verification from the printing apparatus, predicting the degradation of the color accuracy of the printing apparatus based on the result, and calculating and managing a color correction effective time according to the color accuracy level of the printing apparatus; and
  a third process of setting the output order of a plurality of print jobs waiting to be output and the execution timing of the color correction based on the required color accuracy level, the required time of the print job, and the color correction effective time according to the color accuracy level of the printing apparatus.

* * * * *